United States Patent
Matsumura

(10) Patent No.: US 8,928,610 B2
(45) Date of Patent: Jan. 6, 2015

(54) INFORMATION DISPLAY DEVICE AND DOCUMENT DATA EDITING METHOD

(75) Inventor: Hidetoshi Matsumura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 141 days.

(21) Appl. No.: 13/581,216

(22) PCT Filed: Dec. 14, 2010

(86) PCT No.: PCT/JP2010/072507
§ 371 (c)(1),
(2), (4) Date: Aug. 24, 2012

(87) PCT Pub. No.: WO2011/118096
PCT Pub. Date: Sep. 29, 2011

(65) Prior Publication Data
US 2012/0327003 A1      Dec. 27, 2012

(30) Foreign Application Priority Data

Mar. 23, 2010   (JP) ................. 2010-066586

(51) Int. Cl.
*G06F 3/041* (2006.01)
*G06F 3/0488* (2013.01)
*G06F 17/21* (2006.01)

(52) U.S. Cl.
CPC .......... *G06F 3/04883* (2013.01); *G06F 17/214* (2013.01); *G06F 2203/04806* (2013.01); *G06F 2203/04808* (2013.01)
USPC .......................................... 345/173; 345/156

(58) Field of Classification Search
CPC .................................. G06F 3/041; G06F 3/02
USPC .................. 345/173–179, 467, 156–158, 168
See application file for complete search history.

(56) References Cited

U.S. PATENT DOCUMENTS

| 7,479,949 B2 | 1/2009 | Jobs et al. |
| 7,728,821 B2 * | 6/2010 | Hillis et al. ............. 345/173 |

(Continued)

FOREIGN PATENT DOCUMENTS

| CN | 101578577 A | 11/2009 |
| JP | 8-314917 A | 11/1996 |

(Continued)

*Primary Examiner* — Andrew Sasinowski
(74) *Attorney, Agent, or Firm* — Birch, Stewart, Kolasch & Birch, LLP

(57) ABSTRACT

Provided are an information display device and a character string converting method that improve operability at the time of changing a character string on a display screen.
The information display device is configured to have: a display screen 12 for displaying a character string; a touch panel controller 27 that detects an operation position; a character string selecting part 34 that, when two different operation positions are detected, on the basis of a result of the detection of the operation positions, selects a character string on the display screen 12; and a character string converting part 36 that, when a distance between the two operation positions is changed, converts the character string selected by the character string selecting part 34 depending on whether the change is a change that causes the distance between the operation positions to be narrowed or enlarged. For example, the character string converting part 36 converts a full-width character in the character string to a half-width character in the case where the change in distance between the two operation positions is the change that causes the distance between the operation positions to be narrowed, and converts a half-width character in the character string to a full-width character in the case where the change is the change that causes the distance between the operation positions to be enlarged.

9 Claims, 22 Drawing Sheets

(56) References Cited

U.S. PATENT DOCUMENTS

| | | |
|---|---|---|
| 2008/0168402 A1 | 7/2008 | Blumenberg |
| 2010/0245363 A1* | 9/2010 | Jensen .......................... 345/467 |
| 2010/0257478 A1* | 10/2010 | Longe et al. .................. 715/773 |
| 2011/0141144 A1 | 6/2011 | Tomono |

FOREIGN PATENT DOCUMENTS

| | | | |
|---|---|---|---|
| JP | 2010-44628 A | 2/2010 | |
| JP | 2010-277545 A | 12/2010 | |
| JP | 2010277545 | * 12/2010 | .............. G06F 17/24 |

* cited by examiner

Fig.9
(a) VERTICAL PINCH IN OPERATION
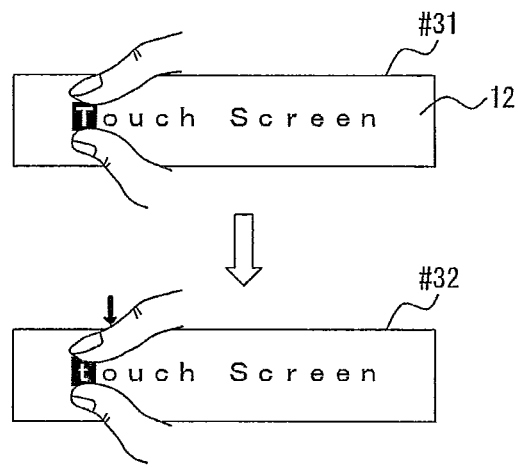
(b) VERTICAL PINCH OUT OPERATION
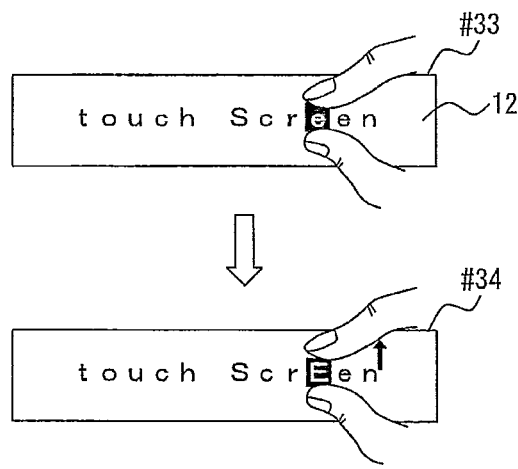

ANOTHER EXAMPLE OF CONVERSION TO ABBREVIATION

Fig.22
(a)
A B C D E KABUSHIKIKAISHA
A B C D E (KABU)
ABCDE (KABU)
(b)
2 CHOME 1 3 BAN 1 2 GOU
2−1 3−1 2
2−1 3−1 2
2-13-12

INFORMATION DISPLAY DEVICE AND DOCUMENT DATA EDITING METHOD

FIELD OF THE INVENTION

The present invention relates to an information display device and a document data editing method, and more particularly, to an information display device and document data editing method that can perform a selection of a character string displayed on a display screen and a conversion process of the selected character string.

BACKGROUND ART

In general, in the case of a mobile information terminal such as a mobile phone or a PDA (Personal Digital Assistant), at the time of entering characters, it is not easy to restore a once-fixed character string to a state before the fixation to perform editing. For example, in the case of entering numbers into an entry form on a website, if a character string fixed as full-width characters is desired to be changed to half-width characters, the half-width characters should be reentered after deletion of the character string.

On the other hand, recently, a technique of performing pinch operation using a thumb and an index finger, called pinch in operation, on a touch panel to thereby zoom out (reduce) a displayed image, and performing enlarging operation called pinch out operation on the touch panel to thereby zoom in (enlarge) the displayed image has been proposed (e.g., Patent Document 1). Accordingly, if by performing the pinch in or pinch out operation on a display screen for displaying character strings, the selection of a character string of which a character type or the like is desired to be changed and a conversion process of the selected character string can be performed, an editing task of character strings can be facilitated and also intuitively performed.

CONVENTIONAL TECHNIQUE LITERATURE

Patent Literatures

Patent literature 1: Specification of U.S. Pat. No. 7,479,949

DISCLOSURE OF THE INVENTION

Problem to be Solved by the Invention

The present invention is made in consideration of the above-described situations, and intended to provide an information display device and document data editing method that improve operability at the time of changing a character string displayed on a display screen. In particular, the present invention is intended to provide an information display device and document data editing method that can easily perform a selection of a character string of which a character type or the like is desired to be changed and a conversion process of the selected character string by intuitive operation. Also, the present invention is intended to provide an information display device that improves operability at the time of changing a full-width character in a character string to a half-width character, or changing a half-width character to a full-width character. Further, the present invention is intended to provide an information display device that can improve operability at the time of changing a word or an idiom in a character string to a corresponding abbreviation, or changing an abbreviation to an original word or idiom.

Means Adapted to Solve Problems

An information display device according to a first aspect of the present invention is configured to be provided with: a display screen for displaying a character string; operation position detecting means adapted to detect an operation position on the display screen; character string selecting means adapted to, when two operations are simultaneously performed on the display screen, and two different operation positions are detected, on the basis of the detected operation positions, select a character string including one or more characters, the character string being displayed on the display screen; pinch operation detecting means adapted to, on the basis of a change in a distance between the operation positions, detect a pinch operation; and character string converting means adapted to, on the basis of a result of the detection by the pinch operation detecting means, performs a conversion process of the selected character string.

In this information display device, when two different operation positions are detected, a character string is selected on the basis of the detected operation positions, and on the basis of a change in distance between the operation positions, the pinch operation is detected. On the basis of a result of the detection of the pinch operation, the conversion process of the selected character string is performed, and therefore the selection of a character string of which a character type or the like is desired to be changed and the conversion process of the selected character string can be easily performed by the pinch operation.

An information display device according to a second aspect of the present invention is, in addition to the above configuration, configured such that the pinch operation detecting means detects pinch in operation that narrows the distance between the operation positions; and the character string converting means performs the conversion process of the selected character string when the pinch in operation is detected. According to such a configuration, the conversion process of a selected character string can be easily performed by the intuitive operation.

An information display device according to a third aspect of the present invention is, in addition to the above configuration, configured such that the pinch operation detecting means detects pinch out operation that enlarges the distance between the operation positions; and the character string converting means performs the conversion process of the selected character string when the pinch out operation is detected. According to such a configuration, the conversion process of a selected character string can be easily performed by the intuitive operation.

An information display device according to a fourth aspect of the present invention is, in addition to the above configuration, configured such that the pinch operation detecting means detects the pinch in operation that narrows the distance between the operation positions and the pinch out operation that enlarges the distance; and the character string converting means performs conversion processes opposite to each other when the pinch in operation is detected and when the pinch out operation is detected, respectively. According to such a configuration, the conversion process of a selected character string can be easily performed by the intuitive operation, and also an erroneously converted character string can be easily restored to an original character string.

An information display device according to a fifth aspect of the present invention is, in addition to the above configuration, configured such that the display screen horizontally displays the character string; the character string selecting means selects a character string including one or more characters when two horizontally separated operation positions are detected, and when two vertically separated operation positions are detected, selects a character string including one character; and the character string converting means performs conversion processes different from each other when horizontal pinch operation is detected and when vertical pinch operation is detected, respectively.

An information display device according to a sixth aspect of the present invention is, in addition to the above configuration, configured such that the character string converting means performs a conversion process between a full-width character and a corresponding half-width character in the case where the horizontal pinch operation is detected, and performs a conversion process between an upper case character and a corresponding lower case character in the case where the vertical pinch operation is detected.

According to such a configuration, in the case of desiring to change a height of a character by changing a character type between an upper case character and a lower case character, by performing operation to vertically pinch the character desired to be changed, the character can be selected, and by the vertical pinch operation, the desired conversion process can be performed. Also, in the case of desiring to change a length of a character string by changing a character type between a full-width character and a half-width character, by performing operation so as to horizontally pinch the character string desired to be changed, the character string can be selected, and by the horizontal pinch operation, the desired conversion process can be performed.

An information display device according to a seventh aspect of the present invention is, in addition to the above configuration, configured such that the character string converting means converts a full-width character in the character string to a corresponding half-width character when the pinch in operation is detected, and when the pinch out operation is detected, converts a half-width character in the character string to a corresponding full-width character.

In this information display device, in the case of desiring to change a character type from a full-width character to a half-width character, by narrowing a distance between operation positions, the full-width character in a selected character string can be converted to the corresponding half-width character. On the other hand, in the case of desiring to change a character type from a half-width character to a full-width character, by enlarging a distance between operation positions, the half-width character can be converted to the corresponding full-width character. According to such a configuration, if a character type is desired to be changed to a half-width character, it is only necessary to narrow a distance between operation positions, whereas if the character type is desired to be changed to a full-width character, it is only necessary to enlarge the distance between the operation positions, and therefore the conversion process of a character string can be performed by the intuitive operation corresponding to the expansion/contraction of the character string.

An information display device according to an eighth aspect of the present invention is, in addition to the above configuration, configured such that the character string converting means performs the conversion process every time the distance between the operation positions are changed by a constant value. According to such a configuration, depending on an amount of change in distance between operation positions, the conversion process can be performed stepwise. Accordingly, by narrowing or enlarging a distance between operation positions until an intended conversion result is obtained, the desired conversion result can be easily obtained.

An information display device according to a ninth aspect of the present invention is, in addition to the above configuration, provided with dictionary information storage means adapted to retain words or idioms with relating each of the words or each of the idioms to a corresponding abbreviation respectively, and configured such that the pinch operation detecting means detects pinch in operation that narrows the distance between the operation positions and pinch out operation that enlarges the distance; and the character string converting means converts the word or the idiom in the character string to the corresponding abbreviation when the pinch in operation is detected, and when the pinch out operation is detected, converts the abbreviation in the character string to the corresponding word or the corresponding idiom.

In this information display device, in the case of desiring to change a word or idiom in a character string to a corresponding abbreviation, by narrowing a distance between operation positions, the word or idiom in the selected character string can be converted to the corresponding abbreviation. On the other hand, in the case of desiring to change an abbreviation to an original word or idiom, by enlarging a distance between operation positions, the abbreviation can be converted to the corresponding word or idiom. According to such a configuration, if a word or an idiom is desired to be changed to a corresponding abbreviation, it is only necessary to narrow a distance between operation positions, whereas if an abbreviation is desired to be changed to an original word or idiom it is only necessary to enlarge the distance between the operation positions, and therefore the conversion process of a character string can be performed by the intuitive operation corresponding to the expansion/contraction of the character string.

An information display device according to a tenth aspect of the present invention is, in addition to the above configuration, provided with: conversion candidate display means adapted to, when the pinch out operation is detected, on the display screen, display two or more conversion candidates that are words or idioms corresponding to the abbreviation in the selected character string and related to the same abbreviation; and conversion candidate selecting means adapted to, on the basis of user operation, select any of the conversion candidates, wherein the character string converting means converts the abbreviation in the character string to the corresponding word or the corresponding idiom on the basis of a result of the selection by the conversion candidate selecting means.

According to such a configuration, in the case where a plurality of conversion candidates for an abbreviation are present, the conversion candidates are displayed on the display screen, and therefore by selecting any of the conversion candidates, a user can converts the abbreviation in a character string to a desired word or idiom.

An information display device according to an eleventh aspect of the present invention is, in addition to the above configuration, provided with priority order determination means adapted to, on the basis of user operation, determine priority order for conversion between a full-width character and a half-width character and conversion between the word or the idiom and the corresponding abbreviation, and configured such that the character string converting means performs the conversion process in the priority order determined by the priority order determination means. According to such a configuration, in user-specified priority order, the conversion process of a character string can be performed.

A document data editing method according to a twelfth aspect of the present invention is configured to be provided with: an operation position detecting step of detecting an operation position on a display screen for displaying a character string; a character string selecting step of, when two operations are simultaneously performed on the display screen and two different operation positions are detected, on the basis of the detected operation positions, selecting a character string including one or more characters, the character string being displayed on the display screen; a pinch operation detecting step of, after the selection of the character string, on the basis of a change in a distance between the operation positions, detecting a pinch operation; and a character string converting step of, on the basis of a result of the detection of the pinch operation, performing a conversion process of the selected character string.

Effects of the Invention

According to the information display device and document data editing method according to the present invention, the selection of a character string of which a character type or the like is desired to be changed, and the conversion process of the selected character string can be easily performed by the pinch operation. In particular, the conversion process of the selected character string can be easily performed by the intuitive operation. Also, if a character type is desired to be changed to a half-width character, it is only necessary to narrow a distance between operation positions, whereas if the character type is desired to be changed to a full-width character, it is only necessary to enlarge the distance between the operation positions. Further, if a word or an idiom is desired to be changed to a corresponding abbreviation, it is only necessary to narrow a distance between operation positions, whereas if an abbreviation is desired to be changed to an original word or idiom, it is only necessary to enlarge the distance between the operation positions. Accordingly, the conversion process of a character string can be preformed by the intuitive operation corresponding to the expansion/contraction of the character string to improve operability at the time of changing the character string displayed on the display screen.

BRIEF DESCRIPTION OF DRAWINGS

FIG. 9 This is an explanatory diagram schematically illustrating another example of the display operation of the mobile phone 100 in FIG. 1.

FIG. 22 This is an explanatory diagram schematically illustrating another example of the display operation of the mobile phone 100 in FIG. 19, in which a situation of state transition of the display screen 12 at the time of the pinch in operation is illustrated.

BEST MODE FOR CARRYING OUT THE INVENTION

First Embodiment

Figure 1:
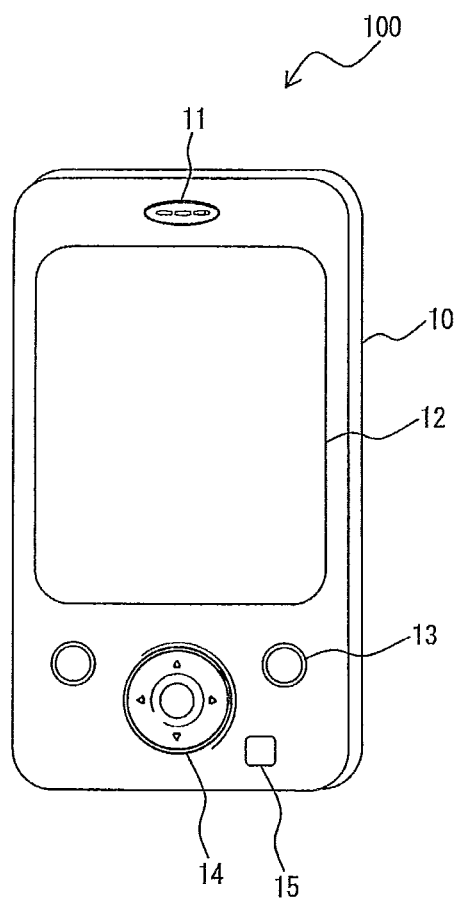
FIG. 1 This is a perspective view illustrating one configuration example of an information display device according to a first embodiment of the present invention, in which a mobile phone 100 is illustrated as one example of the information display device.

FIG. 1 is a perspective view illustrating one configuration example of an information display device according to a first embodiment of the present invention, in which a mobile phone 100 is illustrated as one example of the information display device. The mobile phone 100 is a portable communication terminal, and on a front surface of a vertically long and thin terminal housing 10, a receiver 11, display screen 12, operation keys 13 and 14, and a transmitting microphone 15 are arranged.

Each of the operation keys 13 and 14 is operation input means including a contact type switch that is turned on or off by conduction or interruption between contact points. The operation key 13 is, for example, a power key, an on-hook key, or an off-hook key. The operation key 14 is configured to have: a direction key with which different four directions respectively corresponding to upper, lower, left, and right pressing sites can be inputted; and a decision key.

On the display screen 12, at the time of creating an electronic mail or on another occasion, a character string including a plurality of characters that are arranged in a horizontal or vertical direction is displayed. The display screen 12 serves as a detection surface of a touch panel, which detects a down or up event with respect to the display screen 12, and an input process depending on an operation position is performed.

The down event refers to a motion of bringing a finger, a touch pen, or the like close to the display screen 12, and the up event refers to a motion of moving the finger or the like away from the display screen 12. These events are, in the case of an electrostatic capacitance type touch panel, detected on the basis of an electrostatic capacitance change exceeding a threshold value. In the mobile phone 100, by performing operation on the display screen 12, a character string displayed on the display screen 12 can be selected, and a conversion process of the selected character string can be performed.

Figure 2:
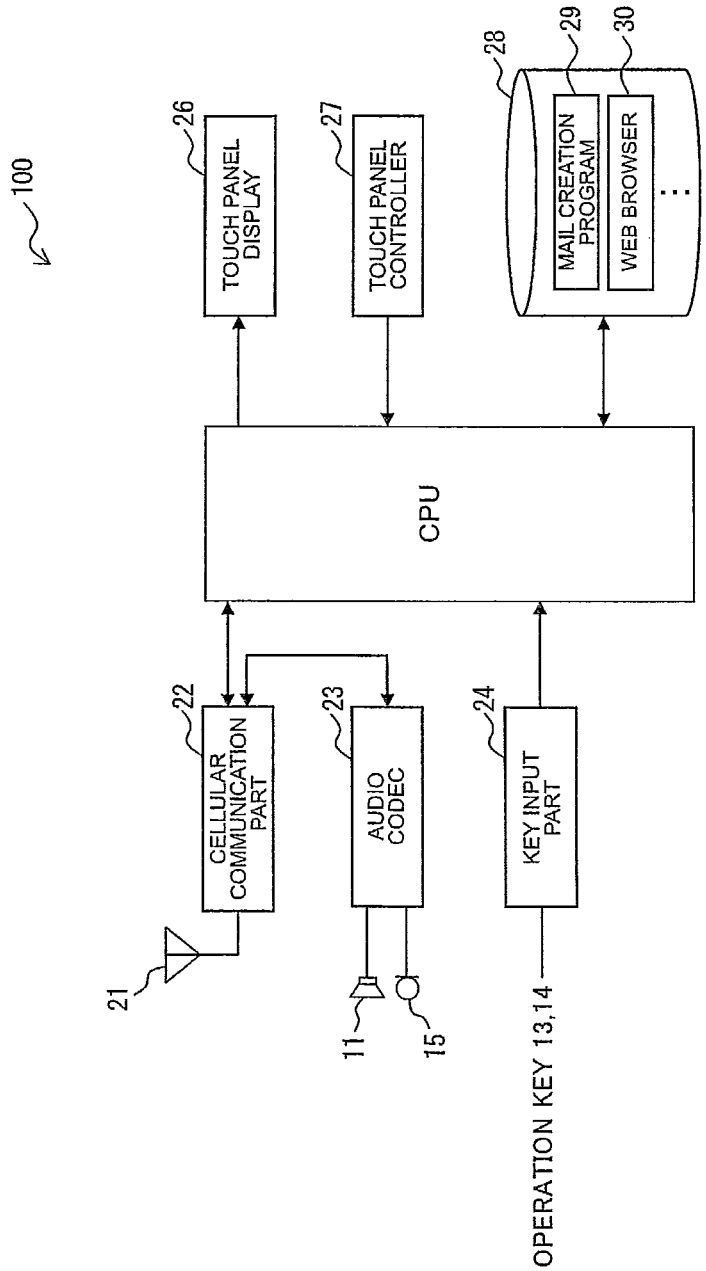
FIG. 2 This is a block diagram illustrating one example of a schematic configuration of the mobile phone 100 in FIG. 1.

FIG. 2 is a block diagram illustrating one example of a schematic configuration of the mobile phone 100 in FIG. 1. The mobile phone 100 is configured to have, in addition to the receiver 11, operation keys 13 and 14, and a transmitting microphone 15, an antenna 21, a cellular communication part 22, an audio codec 23, a key input part 24, a CPU 25, a touch panel display 26, a touch panel controller 27, and an application program storage part 28.

The cellular communication part 22 communicates with a base station through the antenna 21, and transceivers an audio signal or the like with another communication device connected to a mobile communication network. The audio codec 23 decodes an audio signal received by the cellular communication part 22 to output the decoded audio signal from the receiver 11, and also encodes an audio signal inputted through the transmitting microphone 15 to output the encoded audio signal to the cellular communication part 22.

When the operation key 13 or 14 is operated, the key input part 24 generates a predetermined interrupt signal to output the interrupt signal to the CPU 25. The touch panel display 26 is a display device having the display screen 12 as the detection surface for detecting user operation. The touch panel controller 27 is detection means adapted to detect an operation position on the display screen 12, and detects the down or up event with respect to the display screen 12 to generate position data indicating an operation position. The detection of an operation position is repeatedly performed at constant time intervals, and for example, two dimensional position coordinates on the display screen 12 are outputted to the CPU 25 as position data.

The application program storage part 28 retains application programs for realizing various types of functions. For example, a mail creation program 29 for creating an electronic mail, a web browser 30 for downloading web information from a web server and browsing a website, and the like are retained.

The CPU 25 controls the touch panel display 26 on the basis of an application program such as the mail creation program 29 or web browser 30, and displays a mail creation screen or a web site browsing screen on the display screen 12. At this time, on the basis of position data from the touch panel controller 27, a process depending on an operation position on the display screen 12 is performed.

Figure 3:
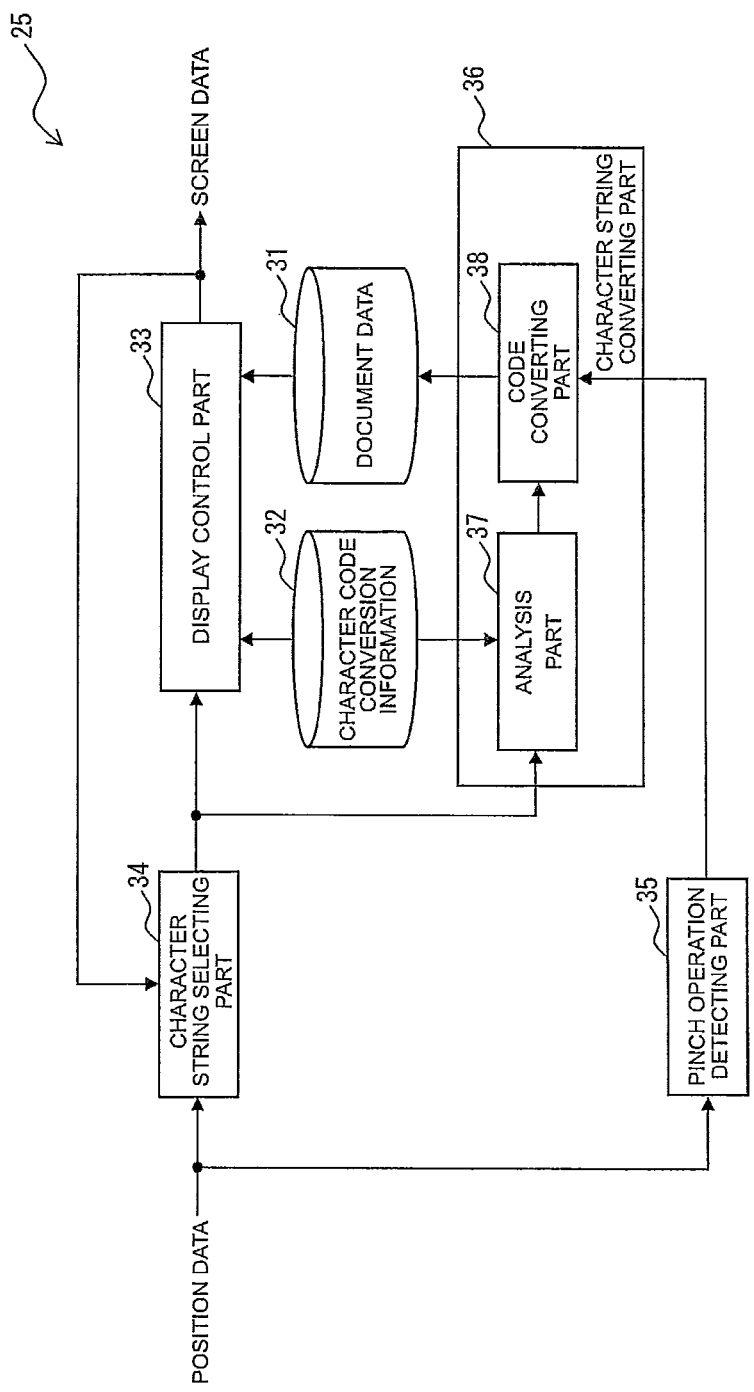
FIG. 3 This is a block diagram illustrating a configuration example in a main part of the mobile telephone 100 in FIG. 2, in which one example of a functional configuration inside the CPU 25 that operates on the basis of an application program is illustrated.

FIG. 3 is a block diagram illustrating a configuration example in a main part of the mobile telephone 100 in FIG. 2, in which one example of a functional configuration inside the CPU 25 that operates on the basis of an application program is illustrated. The CPU 25 is configured to have a document data storage part 31, character code conversion information storage part 32, display control part 33, character string selecting part 34, pinch operation detecting part 35, and character string converting part 36.

The document data storage part 31 retains pieces of document data such as mail texts of received electronic mails, mail documents created at the time of creating mails, pieces of web information downloaded from web servers. The character code conversion information storage part 32 retains a character code table, character code conversion table for converting a character code into a character, font data for displaying a character as an image having a predetermined shape and size, and the like.

The character code table serves as character code conversion information that retains corresponding character codes with relating the character codes to each other. The character code conversion table serves as character code conversion information that retains a plurality of character codes with relating the plurality of character codes to pieces of font data, respectively. In this specification, as characters, Chinese characters, hiragana characters, and katakana characters of Japanese, numbers, alphabetical characters (alphabets), symbols, and the like are retained. The Chinese characters and hiragana characters are full-width characters, and as the katakana characters, numbers, alphabetical characters, and a part of symbols, there are full-width characters and half-width characters corresponding thereto.

The full-width character refers to a character that is, in the case of a monospace font, displayed with a ratio between height and width being 1 to 1, and can be distinguished by, for example, a double-byte character code. On the other hand, the half-width character refers to a character that is displayed with the ratio between height and width being 2 to 1, and can be distinguished by, typically, a single-byte character code. That is, the half-width character is, as compared with a corresponding full-width character, a character of which, even though a height is the same, a width is approximately half. Note that, in the case of a font other than the monospace font, for example, in the case of a proportional font, a half-width character does not necessarily have a ½ width of a corresponding full-width character.

The display control part 33 reads document data from the document data storage part 31, and generates screen data for displaying the document data on the display screen 12. Specifically, by referring to the character code conversion table in the character code conversion information storage part 32 to convert character codes included in the document data into pieces of corresponding font data, the screen data is generated.

The character string selecting part 34 selects, on the basis of position data from the touch panel controller 27, a character string displayed on the display screen 12 as a conversion target, and outputs a result of the selection to the display control part 33 and character string converting part 36. Specifically, in the case where two operations are simultaneously performed on the display screen 12, and two different operation positions are detected, a character string is selected on the basis of the detected operation positions.

That is, in the case of operating the display screen 12 with fingers, if during a period from when the down event by a first finger is detected to when the up event by the first finger is detected, the down event by a second finger is detected, a character string is selected on the basis of operation positions of the first and second fingers at the time of the detection of the down event by the second finger.

For example, in the case of bringing a thumb and an index finger of one hand into contact with the display screen 12, a character string including a character displayed near the thumb, a character displayed near the index finger, and a character placed between the characters is selected. A character string selected as the conversion target includes one or more characters, and even one character of a word including two or more characters can be selected as the conversion target character string.

In the case of a horizontal writing style in which a character string is horizontally displayed, when two horizontally separated operation positions are detected, a character string including one or more characters is selected. On the other hand, when two vertically separated operation positions are detected, a character string including one character is selected.

In the display control part 33, operation for displaying the character string (selected character string) selected by the character string selecting part 34 distinguishably from non-selected characters and the like is performed. For example, the non-selected characters are normally displayed, whereas the selected character string is highlighted (reversely displayed).

The pinch operation detecting part 35 detects pinch operation on the basis of the position data from the touch panel controller 27, and outputs a result of the detection to the character string converting part 36. The pinch operation is predetermined operation performed on the display screen 12, and includes: pinch in operation that narrows a distance between operation positions; and pinch out operation that enlarges a distance between operation positions. Any of these types of pinch operation is detected on the basis of a change in distance between operation positions. For example, an amount of change in distance between operation positions is compared with a predetermined threshold value, and on the basis of a result of the comparison, the pinch operation is detected.

The character string converting part 36 includes an analysis part 37 and a code converting part 38, and on the basis of a result of the detection by the pinch operation detecting part 35, performs a conversion process of the selected character string. The analysis part 37 refers to the character code table in the character code conversion information storage part 32 to analyze the selected character string, and outputs a result of the analysis to the code converting part 38.

The code converting part 38 performs the conversion process of the selected character string on the basis of the detection result by the pinch operation detecting part 35 and the analysis result by the analysis part 37. Specifically, in the case where the pinch in operation is detected, a process of converting character codes in the document data is performed on the selected character string. For example, if a full-width character convertible to a half-width character is included in the selected character string, the full-width character in the selected character string is converted to the corresponding half-width character.

On the other hand, in the case where the pinch out operation is detected, if a half-width character is included in the selected character string, the half-width character is converted to a corresponding full-width character. After such a conversion process of the character string, the screen data is updated by the document data in the document data storage part 31, i.e., by the document data after the character code conversion.

<Pinch in Operation>

Figure 4:
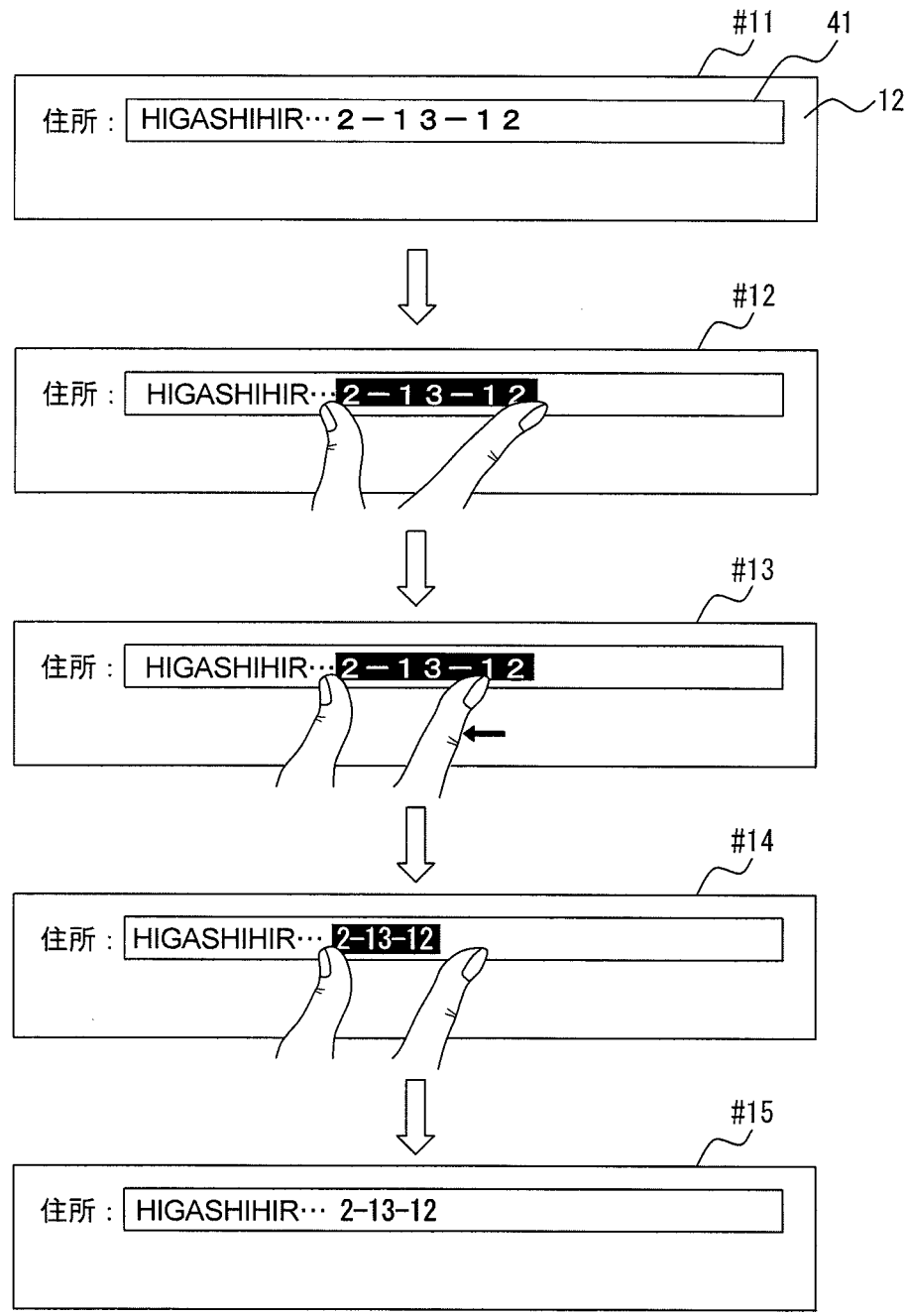
FIG. 4 This is an explanatory diagram schematically illustrating one example of display operation of the mobile phone 100 in FIG. 1, in which a situation of state transition of the display screen 12 at the time of the pinch in operation is illustrated.

FIG. 4 is an explanatory diagram schematically illustrating one example of display operation of the mobile phone 100 in FIG. 1, in which a situation of state transition of the display screen 12 at the time of the pinch in operation is illustrated. The diagram illustrates the case where Japanese characters are displayed in the horizontal writing style, and the selected character string is converted by horizontal pinch in operation. In a state #11, on the display screen 12, an address entry form 41 is arranged, and in the entry form 41, a character string "HIGASHIHIROSHIMA-SHI HACHIHONMATSU (displayed as seven full-width Japanese characters) 2-13-12 (displayed as seven full-width characters)", which is being entered, is displayed. In the case of Japanese characters in the horizontal writing style, the character string includes horizontally arrayed characters.

A state #12 is a state in which a thumb and an index finger are brought into contact with the display screen 12 in the state #11, in which a character string "2-13-12 (displayed as full-width characters)" from a number "2 (full-width character)" at which the thumb is positioned to a number "2 (full-width character)" at which the index finger is positioned is selected as the conversion target. That is, by bringing the fingers into contact with the character string desired to be changed to half-width characters so as to touch the first and last characters of the character string, the character string can be selected as the conversion target. In the state #12, the selected character string "2-13-12 (displayed as full-width characters)" is highlighted.

A state #13 is a state in which the thumb or index finder is moved a predetermined distance from the state #12 so as to narrow a distance between the thumb and the index finger without separating both of the fingers from the display screen 12. That is, the state #13 is a state in which any one or both of the thumb and the index finger are moved horizontally inward.

A state #14 is a state in which by the finger movement, the selected character string is converted to a character string that is shorter in horizontal length. That is, all of the full-width characters in the selected character string "2-13-12 (displayed as full-width characters)" are converted to half-width characters, and the character string "2-13-12 (displayed as half-width characters)" is highlighted as a character string after the conversion. The character type conversion is performed at the time when the finger is moved a distance equal to or more than a predetermined threshold value, for example, at the time when the finger is moved a distance equal to or more than a horizontal size of one half-width character.

The above-described threshold value for an amount of the finger movement may be determined from a horizontal length of the selected character string, or from a difference in length between the character strings before and after the conversion. A state #15 is a state in which both of the fingers are separated from the display screen 12 in the state #14, in which the converted character string "2-13-12 (displayed as half-width characters)" is fixed and normally displayed.

<Pinch Out Operation>

Figure 5:
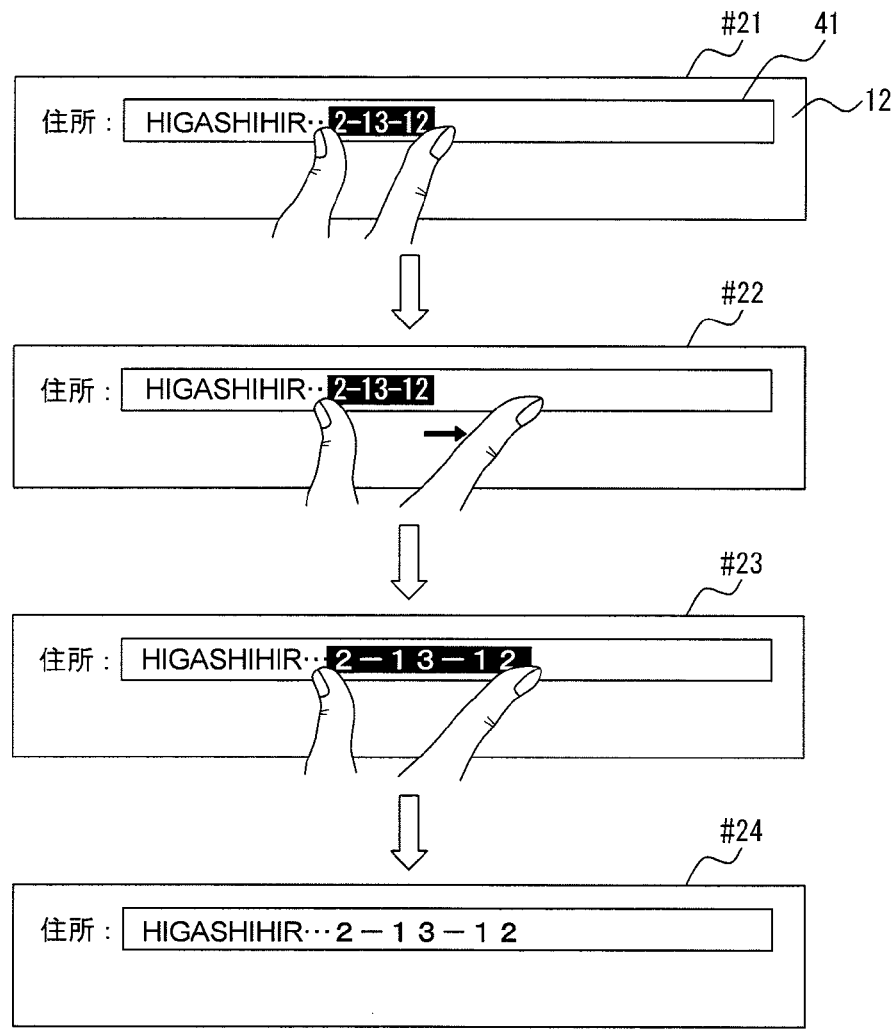
FIG. 5 This is an explanatory diagram schematically illustrating one example of the display operation of the mobile phone 100 in FIG. 1, in which a situation of state transition of the display screen 12 at the time of the pinch out operation is illustrated.

FIG. 5 is an explanatory diagram schematically illustrating one example of the display operation of the mobile phone 100 in FIG. 1, in which a situation of state transition of the display screen 12 at the time of the pinch out operation is illustrated. In a state #21, in the entry form 41 on the display screen 12, a character string "HIGASHIHIROSHIMA-SHI HACHI-HONMATSU (displayed as seven full-width Japanese characters) 2-13-12 (displayed as seven half-width characters)", which is being entered, is displayed. Also, by bringing the thumb and the index finger into contact with the display screen 12, a character string "2-13-12 (displayed as half-width characters)" from a number "2 (half-width character)" at which the thumb is positioned to a number "2 (half-width character)" at which the index finger is positioned is selected as the conversion target.

That is, by bringing the fingers into contact with the character string desired to be changed to full-width characters so as to touch the first and last characters of the character string, the character string can be selected as the conversion target. In the state #21, the selected character string "2-13-12 (displayed as half-width characters)" is highlighted.

A state #22 is a state in which the thumb or index finder is moved a predetermined distance from the state #21 so as to enlarge a distance between the thumb and the index finger without separating both of the fingers from the display screen 12. That is, the state #22 is a state in which any one or both of the thumb and the index finger are moved horizontally outward.

A state #23 is a state in which by the finger movement, the selected character string is converted to a character string that is longer in horizontal length. That is, all of the half-width characters in the selected character string "2-13-12 (displayed as half-width characters)" are converted to full-width characters, and the character string "2-13-12 (displayed as full-width characters)" is highlighted as a character string after the conversion. A state #24 is a state in which both of the fingers are separated from the display screen 12 in the state #23, in which the converted character string "2-13-12 (displayed as full-width characters)" is fixed and normally displayed.

Figure 6:
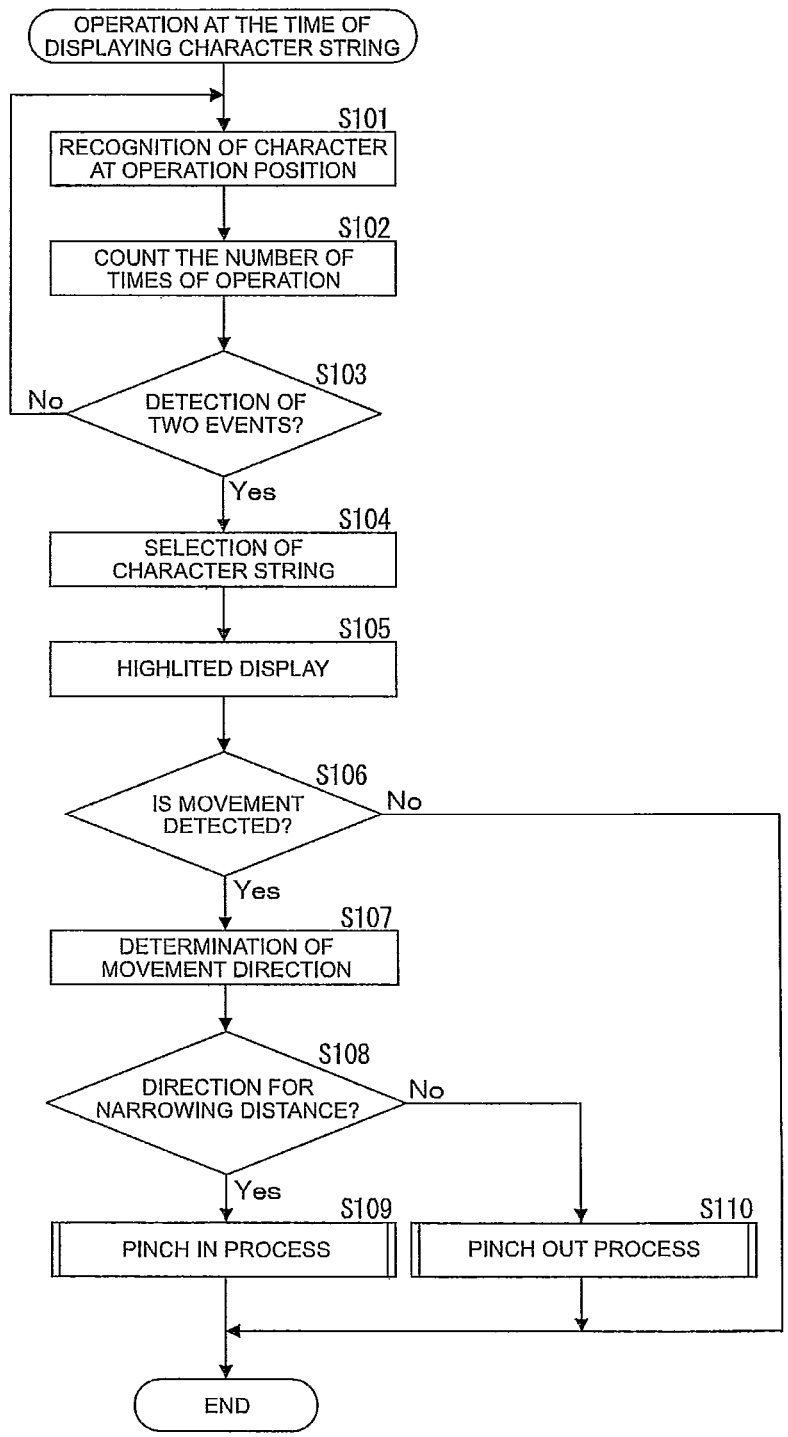
FIG. 6 This is a flowchart illustrating one example of operation of the mobile phone 100 in FIG. 1 at the time of displaying a character string.

Steps S101 to S110 in FIG. 6 represent a flowchart illustrating one example of operation of the mobile phone 100 in FIG. 1 at the time of displaying a character string. First, when a down event is detected, the character string selecting part 34 recognizes a character at an operation position, and counts the number of times of operation (Steps S101 and S102). Steps S101 and S102 are repeated until a second down event is detected, and if the second down event is detected without detection of an up event, a character string is selected on the basis of two operation positions, and the selected character string is highlighted (Steps S103 to S105).

Then, if a finger movement exceeding the threshold is detected on the basis of position data from the touch panel controller 27, the character string converting part 36 determines a direction of the movement (Steps S106 and S107). At this time, if the direction of the finger movement is a direction that causes a distance between the operation positions to be narrowed, a pinch in process is performed (Steps S108 and S109).

On the other hand, if the direction of the finger movement is a direction that causes the distance between the operation positions to be enlarged, a pinch out process is performed (Steps S108 and S110). Also, if in Step S106, an up event is detected before detection of a finger movement, the selection of the character string is cancelled to terminate the processing flow.

Figure 7:
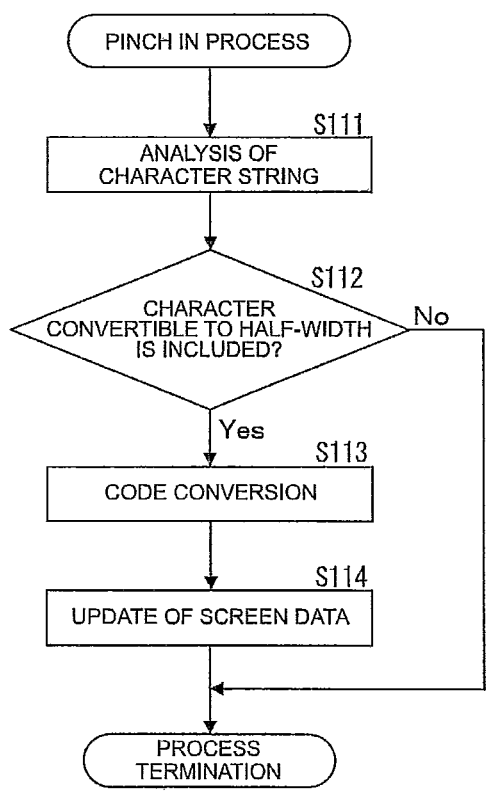
FIG. 7 This is a flowchart illustrating one example of the pinch in process in the mobile phone 100 in FIG. 1.

Steps S111 to S114 in FIG. 7 represent a flowchart illustrating one example of the pinch in process in the mobile phone 100 in FIG. 1. First, the character string converting part 36 analyzes the selected character string to determine whether or not any full-width character convertible to a half-width character is included in the selected character string (Steps S111 and S112). At this time, if any character convertible to a half-width character is not included, this process is immediately terminated.

On the other hand, if some characters convertible to half-width characters are included in the selected character string, all of the convertible full-width characters in the selected character string are converted to the corresponding half-width characters, and screen data is updated by the display control part 33 (Step S113 and S114).

Figure 8:
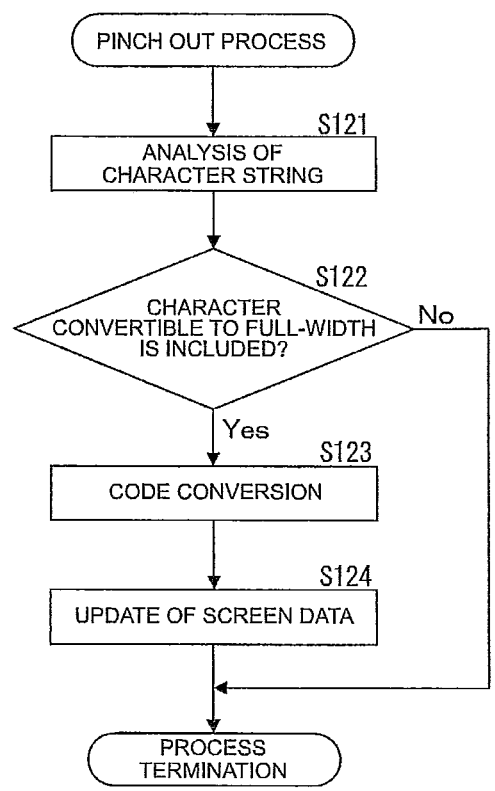
FIG. 8 This is a flowchart illustrating one example of the pinch out process in the mobile phone 100 in FIG. 1.

Steps S121 to S124 in FIG. 8 represent a flowchart illustrating one example of the pinch out process in the mobile phone 100 in FIG. 1. First, the character string converting part 36 analyzes the selected character string to determine whether or not any half-width character convertible to a full-width character is included in the selected character string (Steps S121 and S122). At this time, if any character convertible to a full-width character is not included, this process is immediately terminated.

On the other hand, if some characters convertible to full-width characters are included in the selected character string, all of the half-width characters in the selected character string are converted to the corresponding full-width characters, and the screen data is updated by the display control part 33 (Steps S123 and S124).

According to the present embodiment, the selection of a character string of which a character type is desired to be changed, and the conversion process of the selected character string can be easily performed by the pinch in or pinch out operation. That is, if the character type is desired to be changed to a half-width character, it is only necessary to narrow a distance between operation positions, whereas if the character type is desired to be changed to a full-width character, it is only necessary to enlarge the distance between the operation positions, and therefore the conversion process of the selected character string can be easily performed by the intuitive operation corresponding to the expansion/contraction of the character string. Also, at the time of the pinch in operation and at the time of the pinch out operation, the conversion processes opposite to each other are performed, respectively, and therefore an erroneously converted character string can be easily restored to an original character string.

Note that, in the present embodiment, described is an example of the case of, regarding a character in a selected character string, converting a full-width character to a half-width character by the horizontal pinch in operation, or converting a half-width character to a full-width character by the horizontal pinch out operation; however, the present invention is not limited to this. For example, the present invention may convert an upper case alphabetical character to a lower case character, or convert a lower case character to an upper case character by vertical pinch operation.

FIG. 9 including (a) and (b) is an explanatory diagram schematically illustrating another example of the display operation of the mobile phone 100 in FIG. 1. FIG. 9 (*a*) illustrates a situation of state transition of the display screen 12 at the time of the vertical pinch in operation. A lower case character is, as compared with a corresponding upper case character, a character of which, even though a width is the same, a height is approximately half.

In a state #31, on the display screen 12, a character string "Touch Screen" is displayed, and by bringing the thumb and the index finger into contact with the display screen 12, a character "T" placed between both of the fingers is selected as the conversion target, and highlighted as the selected character string. That is, by bringing the fingers into contact with a character of which a vertical height is desired to be lowered, so as to vertically pinch the character, the character can be selected as the conversion target.

A state #32 is a state in which the thumb or index finger is moved a predetermined distance from the state #31 so as to narrow a distance between the thumb and the index finger without separating both of the fingers from the display screen 12. That is, the state #32 is a state in which any one or both of the thumb and the index finger are moved vertically inward.

The state #32 is a state in which by the finger movement, the selected character is converted to a character that is lower in vertical height. That is, the selected character "T" is converted to a lower case character, and the converted character "t" is highlighted.

FIG. 9 (b) illustrates a situation of state transition of the display screen 12 at the time of the vertical pinch out operation. In a state #33, on the display screen 12, a character string "touch Screen" is displayed, and by bringing the thumb and the index finger into contact with the display screen 12, a character "e" placed between both of the fingers is selected as the conversion target.

A state #34 is a state in which the thumb or index finger is moved a predetermined distance from the state #33 so as to enlarge a distance between the thumb and the index finger without separating both of the fingers from the display screen 12. That is, the state #34 is a state in which any one or both of the thumb and the index finger are moved vertically outward.

The state #32 is a state in which by the finger movement, the selected character is converted to a character that is higher in vertical height. That is, the selected character "e" is converted to an upper case character, and the converted character "E" is highlighted.

By making a configuration in this manner, if a character type is desired to be changed to a lower case character, it is only necessary to narrow a distance between operation positions, whereas if a character type is desired to be changed to an upper case character, it is only necessary to enlarge a distance, and therefore the conversion process of a character string can be easily performed by the intuitive operation corresponding to the expansion/contraction of the character string.

Second Embodiment

In the first embodiment, described is an example of the case of, regarding characters in a selected character string, converting all of convertible full-width characters to half-width characters, or converting all of half-width characters to full-width characters. On the other hand, in the present embodiment, described is the case of, in combination with the conversion of a character type, converting a word or an idiom to a corresponding abbreviation, or converting an abbreviation to an original word or idiom.

Figure 10:
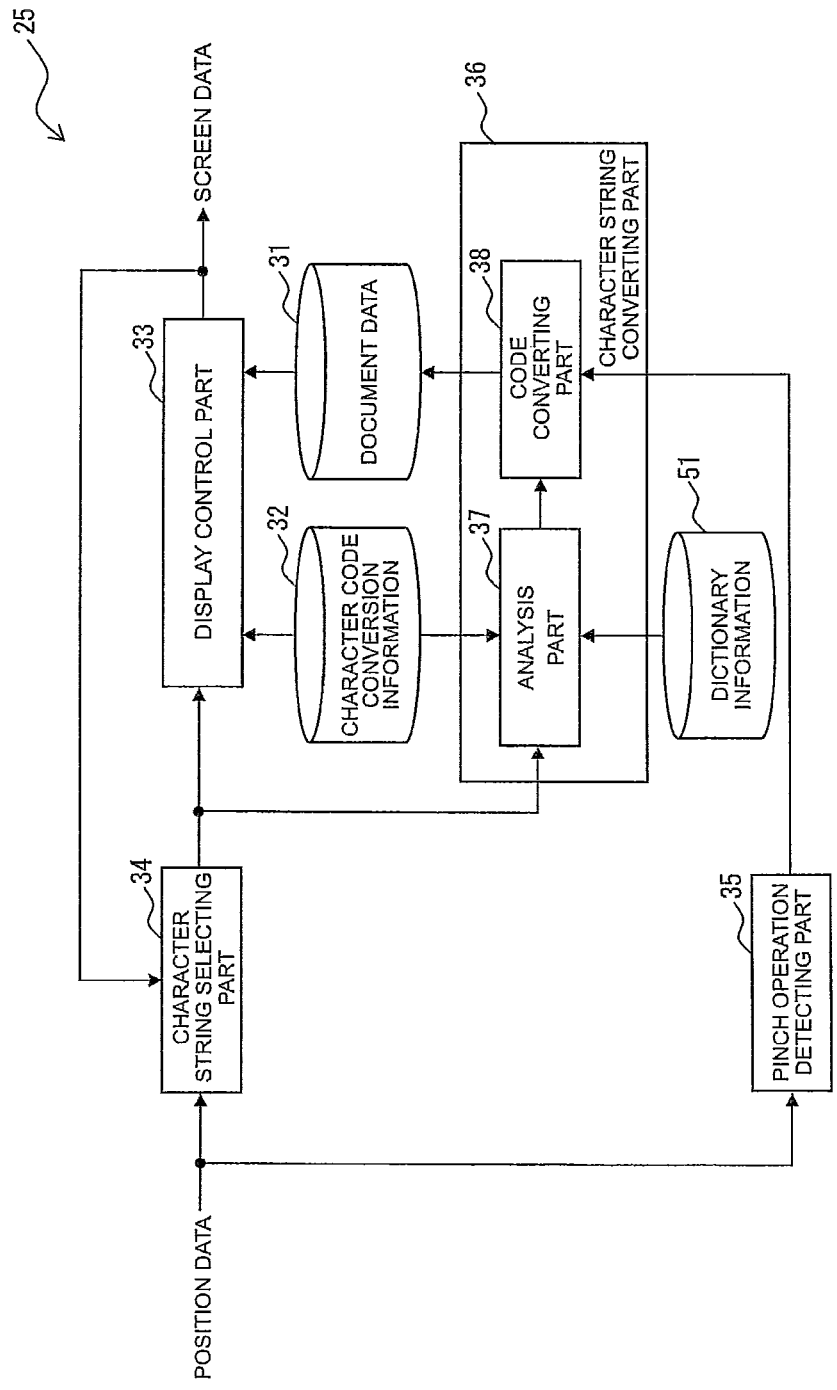
FIG. 10 This is a block diagram illustrating one configuration example of an information display device according to the second embodiment of the present invention, in which another example of the functional configuration inside the CPU 25.

FIG. 10 is a block diagram illustrating one configuration example of an information display device according to the second embodiment of the present invention, in which another example of the functional configuration inside the CPU 25 in the mobile phone 100 is illustrated. The CPU 25 is, as compared with the CPU 25 in FIG. 3, different in that it is provided with a dictionary information storage part 51. The dictionary information storage part 51 retains dictionary information for converting a character string to a character string having a different character type and length. Specifically, words and idioms are retained with being related to corresponding abbreviations.

A word is configured by connecting one or more characters, and a term having at least one meaning. Words include: simple words each of which cannot be divided into smaller units than the simple word; and compound words each of which is configured by connecting a plurality of simple words. On the other hand, an idiom is a term that is configured by connecting a plurality of words and characters each of which does not have any meaning by itself.

An abbreviation is a term that, although having almost the same meaning as that of an original word or idiom, has a smaller number of characters than the original word or idiom, which is created by simplifying an expression. An abbreviation is created by, for example, omitting part of characters constituting a word or an idiom. Note that abbreviations herein are assumed to include so-called emoticons and pictograms.

The analysis part 37 of the character string converting part 36 refers to the dictionary information in the dictionary information storage part 51 to analyze a selected character string. On the basis of a result of the analysis, the code converting part 38 converts the selected character string to a character string having a different length.

Specifically, in the case where the pinch in operation is detected, if a full-width character convertible to a half-width character, or a word or idiom convertible to an abbreviation is included in the selected character string, a process of converting the full-width character in the character string to the corresponding half-width character, or converting the word or idiom to the corresponding abbreviation is performed. On the other hand, in the case where the pinch out operation is detected, a process of converting a half-width character in the character string to a corresponding full-width character, or converting an abbreviation to a corresponding word or idiom is performed.

In the code converting part 38, if in the selected character string, a character that can be subjected to conversion between a full-width character and a half-width character (character type conversion), and a character that can be subjected to conversion between a word or an idiom and a corresponding abbreviation (abbreviation conversion) are included, the character type conversion and the abbreviation conversion are combined to perform a conversion process of the character string.

There may be the case where, after the conversion of the selected character string, a character that can be subjected to the character type conversion or abbreviation conversion is further present in the selected character string. Accordingly, in the code converting part 38, every time a distance between operation positions is changed by a constant value, the conversion process is performed. This enables the conversion process to be performed stepwise depending on an amount of change in distance between the operation positions.

<Multistep Character String Conversion>

Figure 11:
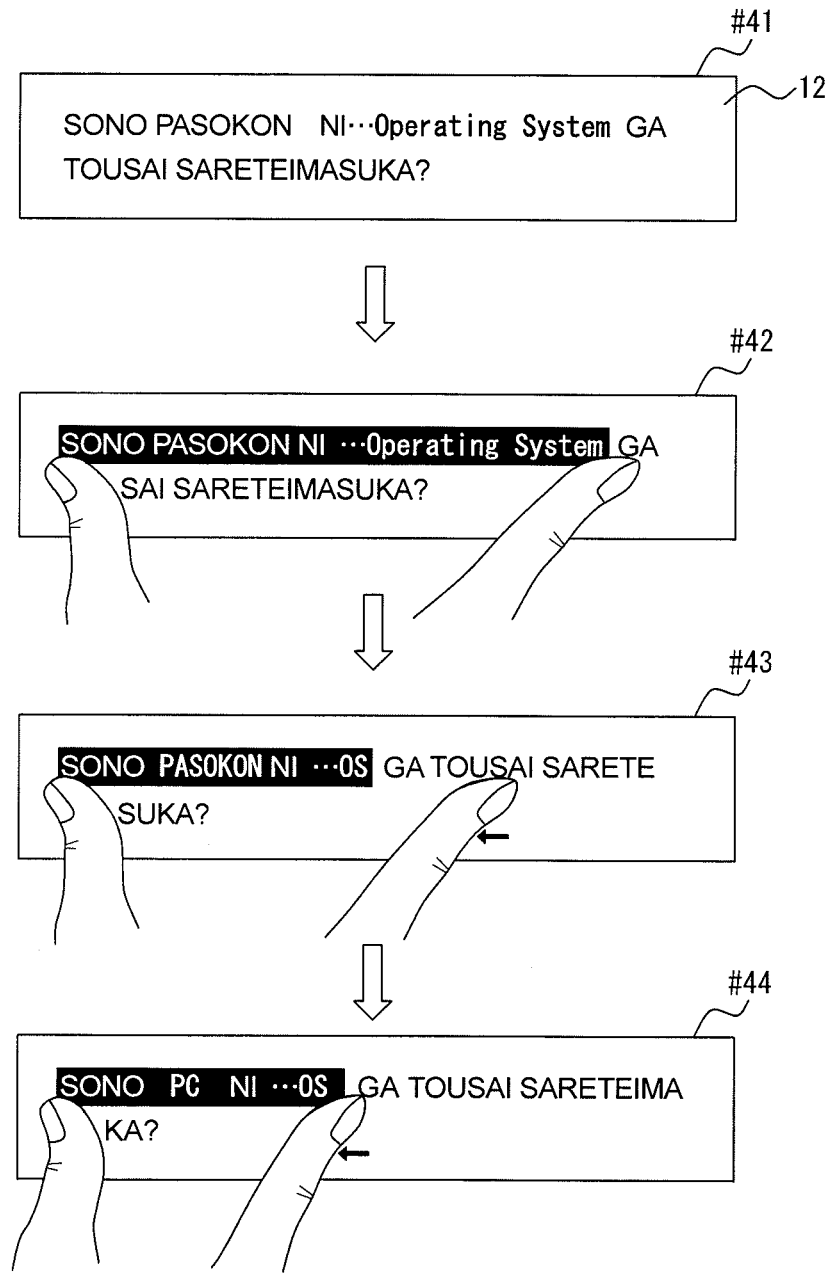
FIG. 11 This is an explanatory diagram schematically illustrating one example of display operation of the mobile phone 100 in FIG. 10, in which a situation of state transition of the display screen 12 at the time of the pinch in operation is illustrated.

FIG. 11 is an explanatory diagram schematically illustrating one example of display operation of the mobile phone 100 in FIG. 10, in which a situation of state transition of the display screen 12 at the time of the pinch in operation is illustrated. In a state #41, on the display screen 12, a character string "SONO PASOKON NIHA, DONO (displayed as eleven full-width Japanese characters) Operating System (displayed as fifteen half-width characters) GA TOUSAI SARETEIMASUKA? (displayed as eleven full-width Japanese characters)" is displayed.

A state #42 is a state in which a thumb and an index finger are brought into contact with the display screen 12 in the state #41, in which a character string "SONO PASOKON NIHA, DONO (displayed as full-width Japanese characters) Operating System (displayed as half-width characters)" from a character "SO (one full-width Japanese character)" at which the thumb is positioned to a character "m (half-width character)" at which the index finger is positioned is selected as a conversion target, and the selected character string is highlighted.

A state #43 is a state in which the thumb or index finger is horizontally moved a predetermined distance from the state #42 so as to narrow a distance between the thumb and the index finger without separating both of the fingers from the display screen 12. In the state #43, by the finger movement, "PASOKON", which is displayed as full-width Japanese characters in the selected character string, is converted to "PASOKON", which is displayed as half-width Japanese characters, and words "Operating System" is converted to an abbreviation "OS".

A state #44 is a state in which a distance between the thumb and the index finger is further narrowed from the state #43 without separating both of the fingers from the display screen 12. In the state #44, by the second finger movement, "PASOKON", which is displayed as half-width Japanese characters in the selected character string, is converted to an abbreviation "PC (displayed as half-width characters)".

If, in a selected character string after the character type conversion or abbreviation conversion, a character that can be subjected to the character type conversion or abbreviation conversion is further present, by further moving a finger without separating both of the fingers from the display screen 12, the character type conversion or abbreviation conversion of the character can be performed.

Along with this diagram, described is an example of the case of using the pinch in operation to convert the selected character string to the character string that is shorter in horizontal length; however, the case of using the pinch out operation to convert a selected character string to a character string that is longer in horizontal length is also similar to the case of the pinch in operation.

Figure 12:
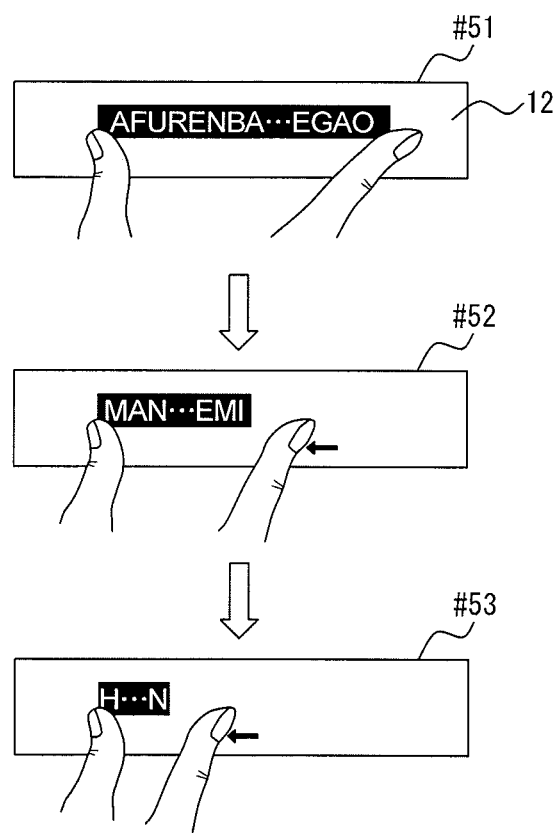
FIG. 12 This is an explanatory diagram schematically illustrating another example of the display operation of the mobile phone 100 in FIG. 10, and illustrates the case of using the pinch in operation to convert an idiom in a selected character string to a corresponding abbreviation.

FIG. 12 is an explanatory diagram schematically illustrating another example of the display operation of the mobile phone 100 in FIG. 10, and illustrates the case of using the pinch in operation to convert an idiom in a selected character string to a corresponding abbreviation. In a state #51, on the display screen 12, an idiom "AFURENBAKARINO EGAO (displayed as ten full-width Japanese characters)" is displayed. Also, by bringing the thumb and index finger into contact with the display screen 12, the character string "AFURENBAKARINO EGAO" from a character "A (displayed as one full-width Japanese character)" at which the thumb is positioned to a character "GAO (displayed as one full-width Japanese character)" at which the index finger is positioned is selected as the conversion target, and the selected character string is highlighted.

In a state #52 is a state in which the thumb or index finger is horizontally moved a predetermined distance from the state #51 so as to narrow a distance between the thumb and the index finger without separating both of the fingers from the display screen 12. In the state #52, by the finger movement, the idiom "AFRENBAKARINO EGAO" in the selected character string is converted to an idiom "MANMENNO EMI (displayed as five full-width Japanese characters)" as an abbreviation that is shorter in length.

A state #53 is a state in which a distance between the thumb and the index finger is further narrowed from the state #52 without separating both of the fingers from the display screen 12. In the state #53, by the second finger movement, the idiom "MANMENNO EMI" in the selected character string is converted to words "HAGAN (displayed as two full-width Japanese characters) as an abbreviation that is shorter in length.

Figure 13:
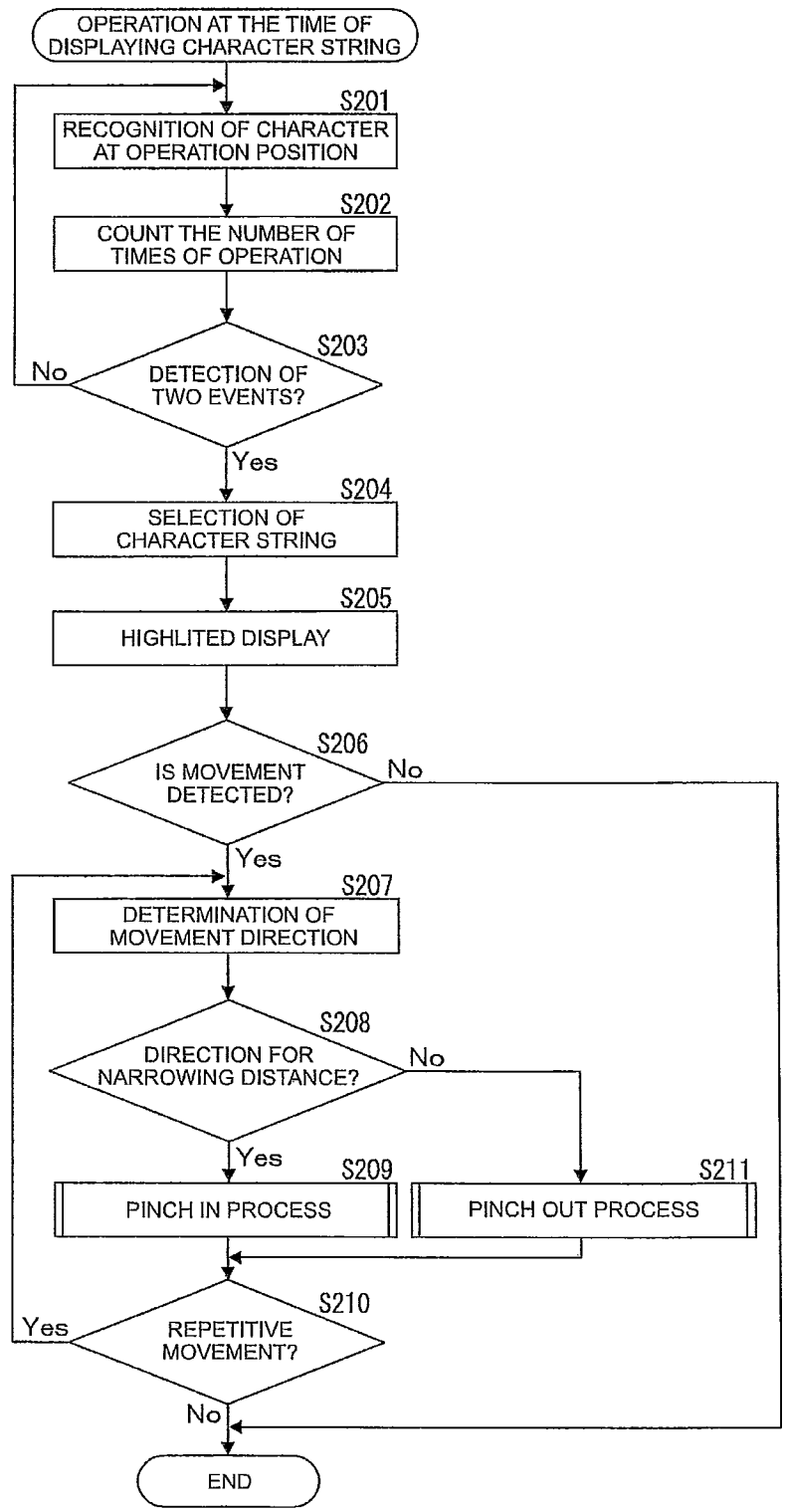
FIG. 13 This is a flowchart illustrating one example of operation of the mobile phone 100 in FIG. 10 at the time of displaying a character string.

Steps S201 to S211 in FIG. 13 represent a flowchart illustrating one example of operation of the mobile phone 100 in FIG. 10 at the time of displaying a character string. A processing procedure from Step S201 to Step S207 is the same as a processing procedure from Step S101 to Step S107 in FIG. 6.

In Step S208, after a finger movement exceeding the threshold has been detected, the character string converting part 36 determines a direction of the movement, and as a result, if the direction of the finger movement is a direction that causes a distance between the operation positions to be narrowed, a pinch in process is performed (Step S209).

On the other hand, if the direction of the finger movement is a direction that causes the distance between the operation positions to be enlarged, a pinch out process is performed (Step S211). A processing procedure from Step S207 to Step S209 or Step S207 to Step S211 is repeated if a repetitive movement is detected (Step S210).

Figure 14:
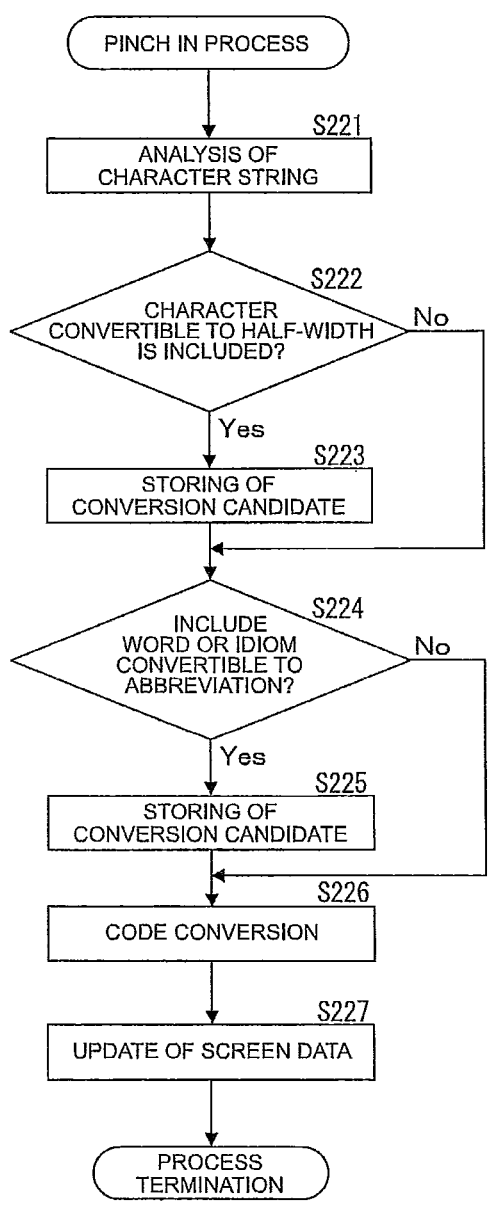
FIG. 14 This is a flowchart illustrating one example of the pinch in process in the mobile phone 100 in FIG. 10.

Steps S221 to S227 in FIG. 14 represent a flowchart illustrating one example of the pinch in process in the mobile phone 100 in FIG. 10. First, the character string converting part 36 analyzes the selected character string to determine whether or not any full-width character convertible to a half-width character is included in the selected character string (Steps S221 and S222).

At this time, if some characters convertible to half-width characters are included, conversion candidates for all of the convertible full-width characters in the selected character string are stored (Step S223). Then, the character string converting part 36 determines whether or not any word or idiom convertible to an abbreviation is included in the selected character string (Step S224).

At this time, if some words or idioms convertible to abbreviations are included, conversion candidates for all of the convertible words or idioms in the selected character string are stored (Step S225). Subsequently, the character string converting part 36 converts all of the convertible full-width characters in the selected character string to the corresponding half-width characters, and converts all of the convertible words or idioms in the selected character string to the corresponding abbreviations (Step S226).

Then, on the basis of document data after the character string conversion, the display control part 33 updates the screen data (Step S227). Along with this flowchart, described is one example of the pinch in process; however, the case of the pinch out process is also similar to the case of the pinch in operation.

In the case of combining the character type conversion and the abbreviation conversion to perform the character string conversion, if a plurality of types of conversion candidates are present, the conversion process shall be performed in priority order that is preset as a default setting. The priority order is set in the order of, for example, the character type conversion, the abbreviation conversion of a word, and the abbreviation conversion of an idiom, and a high priority conversion candidate is extracted as a first candidate. In this case, as conversion candidates for "PASOKON" displayed as full-width characters, "PASOKON" displayed as half-width characters and the abbreviation "PC" are present, and of these conversion candidates, "PASOKON" displayed as half-width characters, which is the highest priority conversion candidate, serves as the first candidate.

According to the present embodiment, if a word or an idiom is desired to be changed to a corresponding abbreviation, it is only necessary to narrow a distance between operation positions, whereas if an abbreviation is desired to be changed to an original word or idiom, it is only necessary to enlarge a distance between operation positions, and therefore the conversion process of a character string can be easily performed by the intuitive operation corresponding to the expansion/contraction of the character string.

Third Embodiment

In the second embodiment, described is an example of the case of, in combination with the character type conversion, converting a word or an idiom to a corresponding abbreviation, or converting an abbreviation to an original word or idiom. On the other hand, in the present embodiment, described is the case of, at the time of using the pinch out operation to convert an abbreviation to an original word or idiom, displaying conversion candidates for the word or idiom on a display screen 12.

Figure 15:
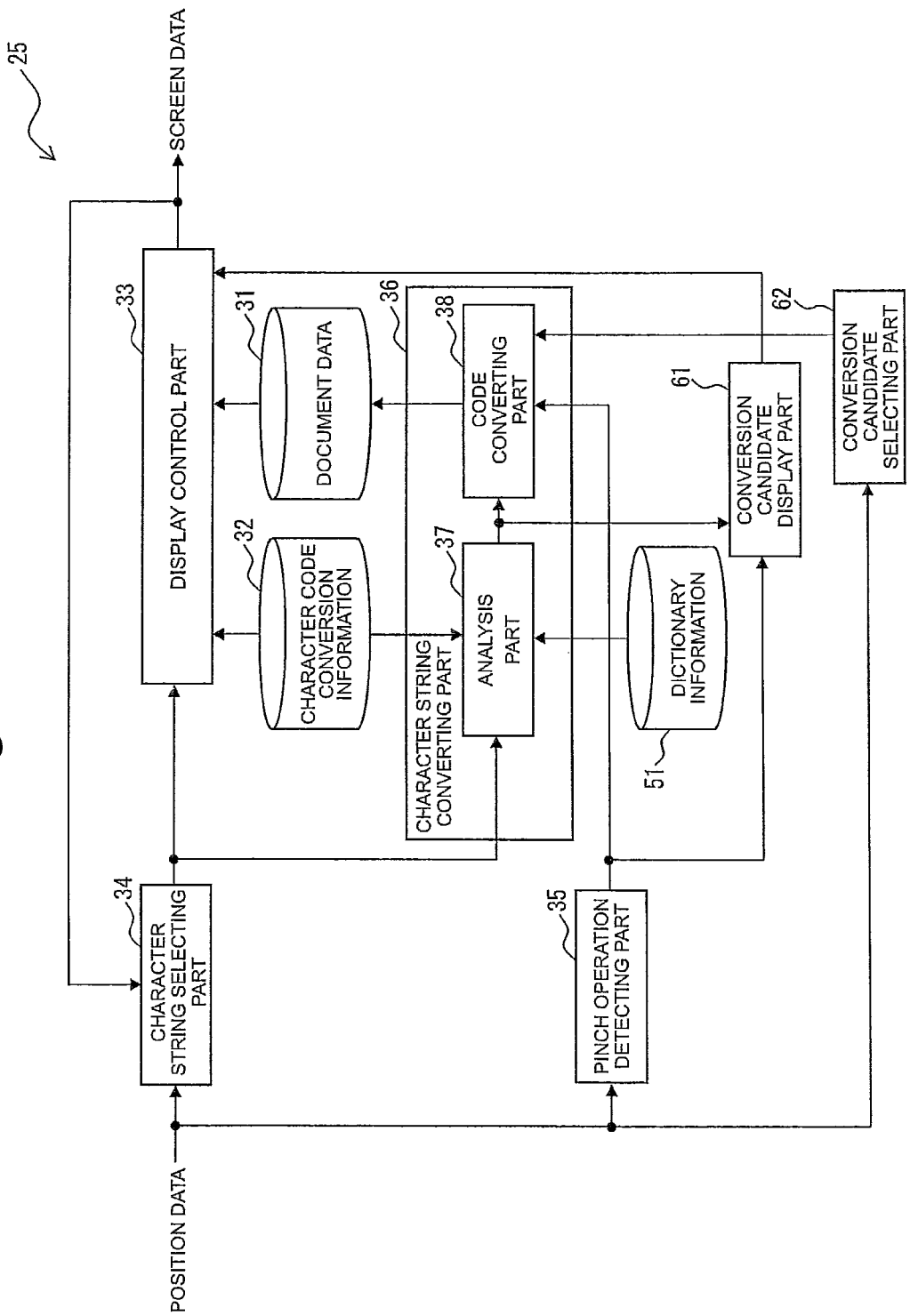
FIG. 15 This is a block diagram illustrating one configuration example of an information display device according to a third embodiment of the present invention, in which another example of the functional configuration inside the CPU 25 in the mobile phone 100 is illustrated.

FIG. 15 is a block diagram illustrating one configuration example of an information display device according to a third embodiment of the present invention, in which another example of the functional configuration inside the CPU 25 in the mobile phone 100 is illustrated. The CPU 25 is, as compared with the CPU 25 in FIG. 10, different in that it is provided with a conversion candidate display part 61 and a conversion candidate selecting part 62.

The conversion candidate display part 61 displays conversion candidates for a selected character string on the display screen 12 on the basis of a detection result by the pinch operation detecting part 35 and an analysis result by the analysis part 37. Specifically, it is determined whether or not for an abbreviation in the selected character string, a plurality of conversion candidates that are words or idioms corresponding to the abbreviation and related to the same abbreviation are present. If the plurality of conversion candidates is present, the conversion candidates are displayed on the display screen 12 when the pinch out operation is detected.

The conversion candidate selecting part 62 selects any one of the conversion candidates on the basis of user operation, and outputs a result of the selection to the code converting part 38 and display control part 33. For example, on the basis of position data from the touch panel controller 27, the conversion candidate is selected. In the character string converting part 36, on the basis of the selection result by the conversion candidate selecting part 62, the abbreviation in the character string is converted to a corresponding word or idiom.

<List of Conversion Candidate>

Figure 16:
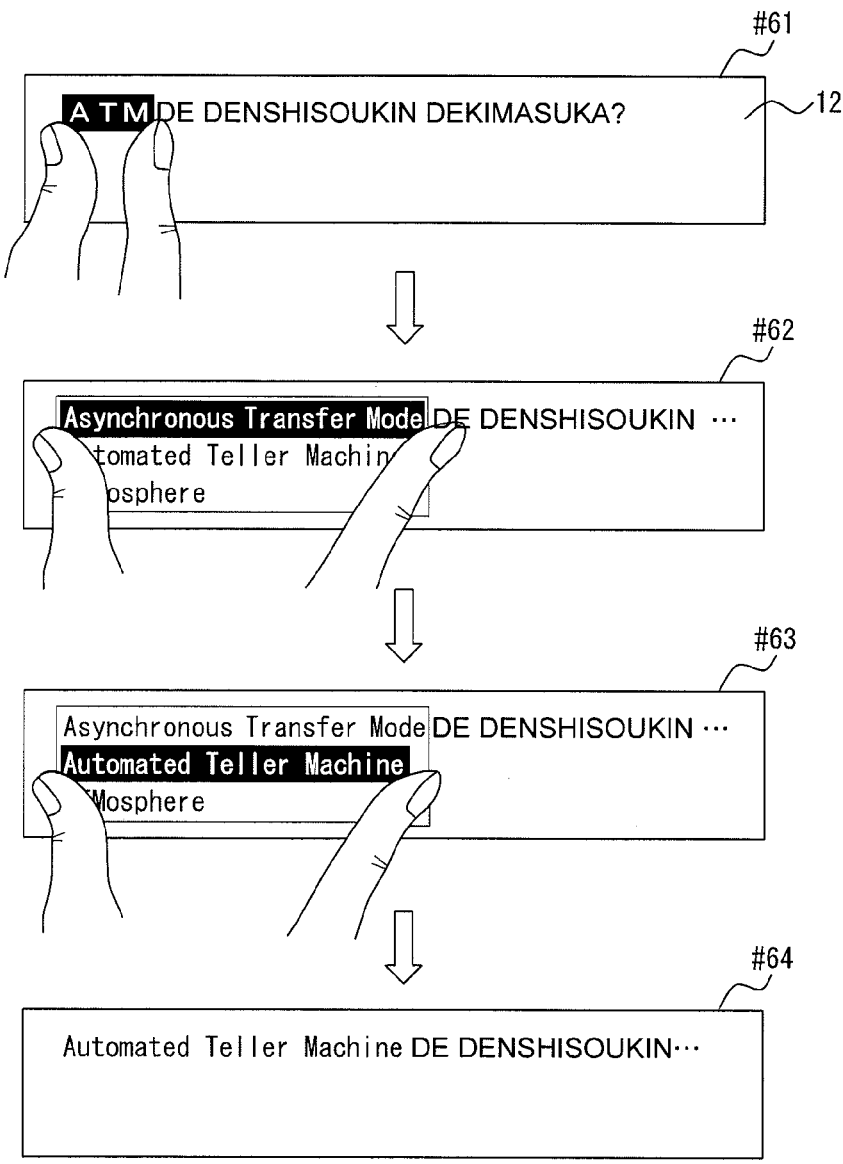
FIG. 16 This is an explanatory diagram schematically illustrating one example of display operation of the mobile phone 100 in FIG. 15, in which a character string conversion candidate list that is displayed on the display screen 12 at the time of the pinch out operation is illustrated.

FIG. 16 is an explanatory diagram schematically illustrating one example of display operation of the mobile phone 100 in FIG. 15, in which a character string conversion candidate list that is displayed on the display screen 12 at the time of the pinch out operation is illustrated. In a state #61, on the display screen 12, a character string "ATM (displayed as alphabetical characters) DE DENSHISOUKIN DEKIMASUKA? (displayed as eleven full-width Japanese characters) is displayed. Also, by bringing a thumb and an index finger into contact with the display screen 12, the abbreviation "ATM" as a character string from the character "A" at which the thumb is positioned to the character "M" at which the index finger is positioned is selected as a conversion target, and the selected character string is highlighted.

A state #62 is a state in which the thumb or index finger is horizontally moved a predetermined distance from the state #61 so as to enlarge a distance between the thumb and the index finger without separating both of the fingers from the display screen 12. In the state #62, by the finger movement, the abbreviation "ATM" is converted to words "Asynchronous Transfer Mode (displayed as alphabetical characters)", and the character string after the conversion is highlighted.

For the abbreviation "ATM", as corresponding words, in addition to the above-described words "Asynchronous Transfer Mode", words "Automated Teller Machine", "ATMosphere" (both of which are displayed as alphabetical characters), and the like are present, and therefore in the state #62, these words are also displayed as conversion candidates. The respective conversion candidates are listed as the candidate list. For example, on a lower side of the conversion candidate selected as default, the other conversion candidates are arranged with being lined up.

A state #63 is a state in which both of the fingers are moved downward a predetermined distance from the state #62 without separating the fingers from the display screen 12. In the state #63, by the finger movement, the words "Automated Teller Machine" in the candidate list are selected. A state #64 is a state in which both of the fingers are separated from the display screen 12 in the state #63, in which the words "Automated Teller Machine" are fixed and normally displayed.

Figure 17:
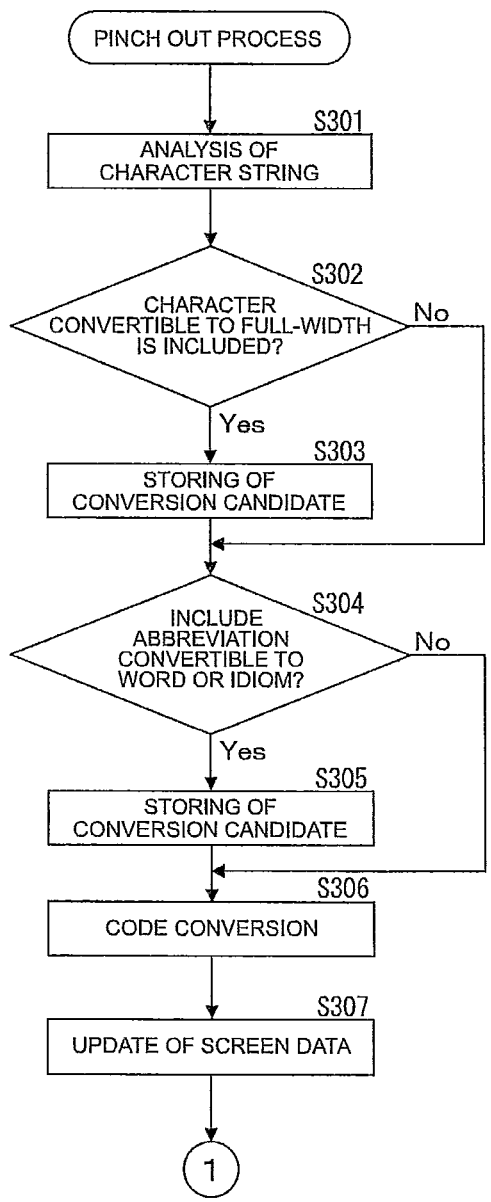
FIG. 17 This is a flowchart illustrating one example of the pinch out process in the mobile phone 100 in FIG. 15.
Figure 18:
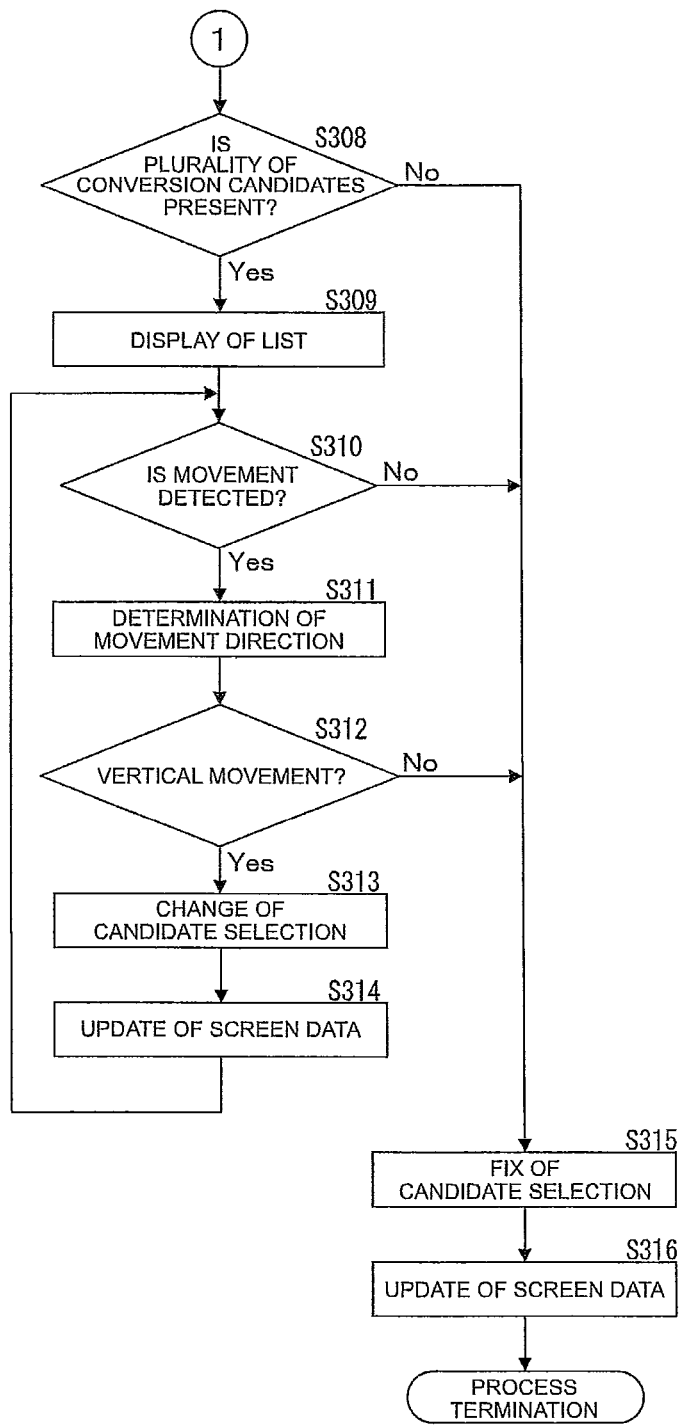
FIG. 18 This is a flowchart illustrating one example of the pinch out process in the mobile phone 100 in FIG. 15.

Steps S301 to S316 in FIGS. 17 and 18 represent a flowchart illustrating one example of the pinch out process in the mobile phone 100 in FIG. 15. First, the character string converting part 36 analyzes a selected character string to determine whether or not any half-width character convertible to a full-width character is included in the selected character string (Steps S301 and S302).

At this time, if some characters convertible to full-width characters are included, conversion candidates for all of the half-widths characters in the selected character string are stored (Step S303). Then, the character string converting part 36 determines whether or not any abbreviation convertible to a word or an idiom is included in the selected character string (Step S304).

At this time, if some abbreviations convertible to words or idioms are included, conversion candidates for all of the convertible abbreviations in the selected character string are stored (Step S305). Subsequently, the character string converting part 36 converts all of the half-width characters in the selected character string to the corresponding full-width characters, and converts all of the convertible abbreviations in the selected character string to the corresponding words or idioms (Step S306). Then, screen data is updated by the display control part 33 (Step S307).

After that, the conversion candidate display part 61 determines whether or not for any of the abbreviations in the selected character string, a plurality of conversion candidates that are words or idioms corresponding to the abbreviation and related to the same abbreviation is present (Step S308). If the plurality of conversion candidates are present, the conversion candidates are displayed on the display screen 12 as a candidate list (Step S309).

Subsequently, if on the basis of position data from the touch panel controller 27, detecting a finger movement exceeding a threshold, the conversion candidate selecting part 62 determines a direction of the movement (Steps S310 and S311). At this time, if the finger movement direction is vertical, a candidate selection is changed on the basis of an amount of the movement, and the screen data is updated by the display control part 33 (Steps S312 to S314).

A processing procedure from Step S310 to Step S314 is repeated until in Step S310, the up event is detected, or until in Step S312, a finger movement in a direction other than the vertical direction is detected.

On the other hand, if in Step S308, the plurality of conversion candidates are not present, if in Step S310, the up event is detected before detection of a finger movement, or if in Step S312, the finger movement in a direction other than the vertical direction is detected, the candidate selection is fixed and the screen data is updated (Steps S315 and S316).

According to the present embodiment, if a word or an idiom is desired to be changed to a corresponding abbreviation, it is only necessary to narrow a distance between operation positions, whereas if an abbreviation is desired to be changed to an original word or idiom, it is only necessary to enlarge a distance between operation positions, and therefore the conversion process of a character string can be performed by the intuitive operation corresponding to the expansion/contraction of the character string. In particular, if a plurality of conversion candidates for an abbreviation are present, these conversion candidates are displayed on the display screen 12, and therefor by selecting any of the conversion candidates, a user can convert the abbreviation in a character string to a desired word or idiom.

Fourth Embodiment

In the second embodiment, described is an example of the case of combining the character type conversion and the abbreviation conversion to perform the character string conversion. On the other hand, in the present embodiment, described is the case where priority order for the character type conversion and the abbreviation conversion can be changed.

Figure 19:
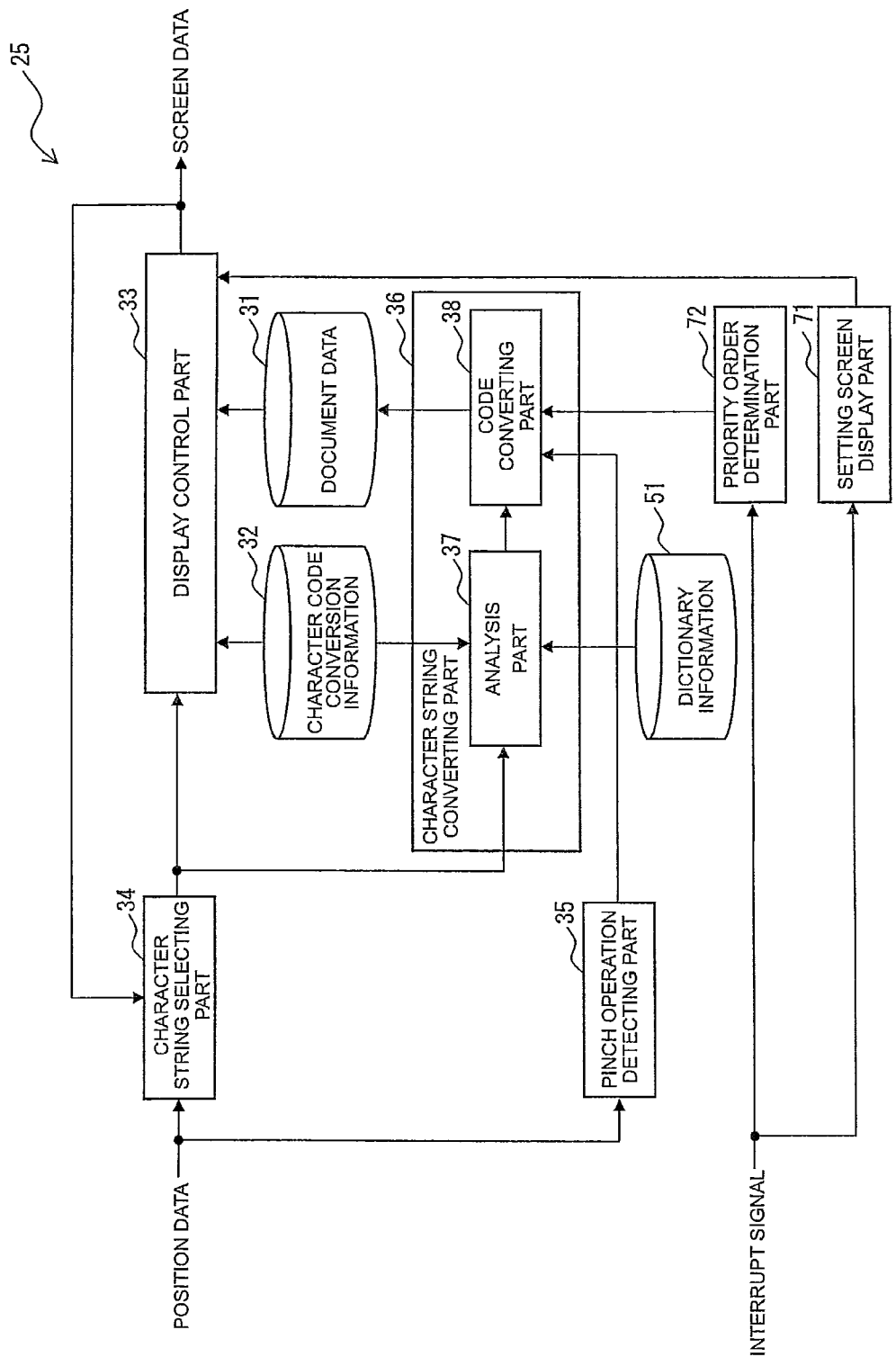
FIG. 19 This is a block diagram illustrating one configuration example of an information display device according to a fourth embodiment of the present invention, in which another example of the functional configuration inside the CPU 25 in the mobile phone 100 is illustrated.

FIG. 19 is a block diagram illustrating one configuration example of an information display device according to a fourth embodiment of the present invention, in which another example of the functional configuration inside the CPU 25 in the mobile phone 100 is illustrated. The CPU 25 is, as compared with the CPU 25 in FIG. 10, different in that it is provided a setting screen display part 71 and a priority order determination part 72.

The setting screen display part 71 sets the priority order for the character type conversion between a full-width character and a half-width character and the abbreviation conversion between a word or an idiom and a corresponding abbreviation, or on the display screen 12, displays a setting screen for setting an enablement or disablement of each conversion function. The setting screen is displayed on the basis of, for example, an interrupt signal from the key input part 24 or touch panel controller 27.

The priority order determination part 72 determines the priority order for the character type conversion and the abbreviation conversion on the basis of user operation, and outputs a result of the determination to the code converting part 38. In the character string converting part 36, the conversion process is performed in the priority order determined by the priority order determination part 72.

Figure 20:
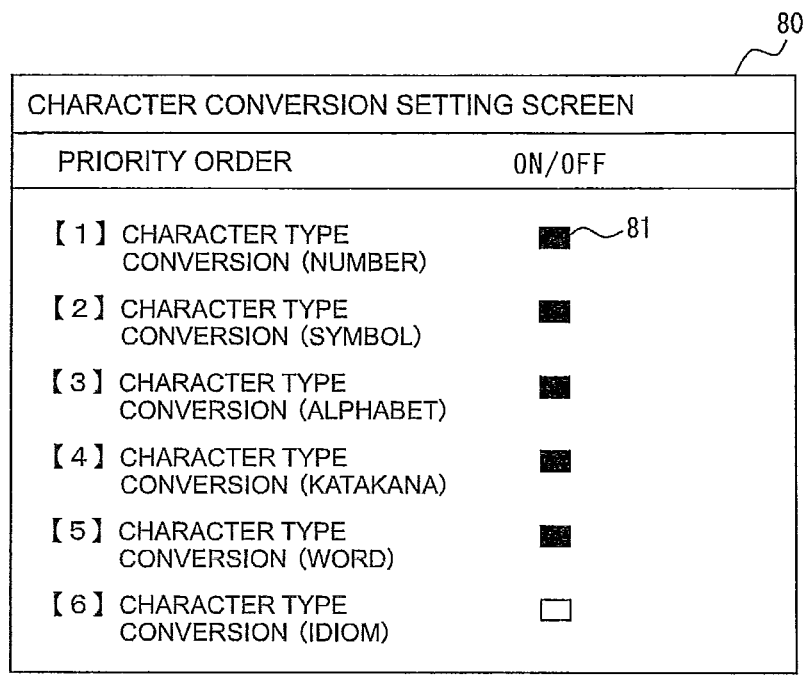
FIG. 20 This is a diagram illustrating one example of operation of the mobile phone 100 in FIG. 19, in which the character conversion setting screen 80 displayed on the display screen 12 is illustrated.

FIG. 20 is a diagram illustrating one example of operation of the mobile phone 100 in FIG. 19, in which the character conversion setting screen 80 displayed on the display screen 12 is illustrated. The setting screen 80 is an input screen for setting the priority order for the character type conversion and the abbreviation conversion, and also setting the enablement or disablement of each of the conversion functions for them.

Specifically, the priority order can be arbitrarily specified for the character type conversion of katakana characters, character type conversion of numbers, character type conversion of alphabetical characters, character type conversion of symbols, abbreviation conversion of words, and abbreviation conversion of idioms. Also, any of the enablement (on) and disablement (off) of each of these six conversion functions can be arbitrarily specified.

In this example, the priority order is specified in the order of the character type conversion of numbers, character type conversion of symbols, character type conversion of alphabetical characters, character type conversion of katakana characters, abbreviation conversion of words, and abbreviation conversion of idioms. Also, the conversion functions for the character type conversion of numbers, character type conversion of symbols, character type conversion of alphabetical characters, character type conversion of katakana characters, and abbreviation conversion of words are enabled, and the conversion function for the abbreviation conversion of idioms is disabled. The enablement or disablement of each of the conversion functions can be switched by operating a checkbox 81.

Figure 21:
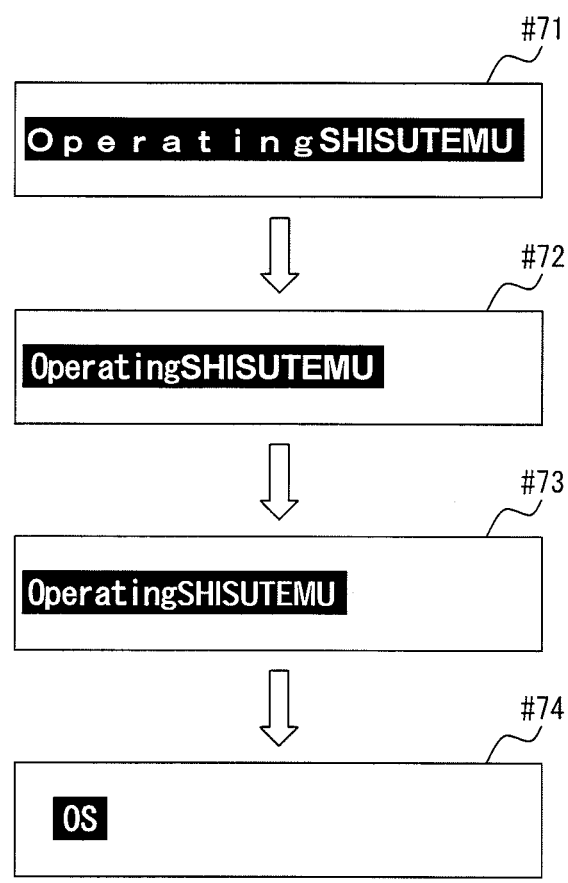
FIG. 21 This is an explanatory diagram schematically illustrating one example of display operation of the mobile phone 100 in FIG. 19, in which a situation of state transition of the display screen 12 at the time of the pinch in operation is illustrated.

FIG. 21 is an explanatory diagram schematically illustrating one example of display operation of the mobile phone 100 in FIG. 19, in which a situation of state transition of the display screen 12 at the time of the pinch in operation is illustrated. In a state #71, on the display screen 12, a character string "Operating (displayed as full-width alphabetical characters) SHISUTEMU (displayed as four full-width Japanese katakana characters)" is displayed, and by bringing a thumb and an index finger into contact with the display screen 12, the character string is selected as a conversion target.

In a state #72, by horizontally moving the thumb or index finger a predetermined distance from the state #71 so as to narrow a distance between the thumb and the index finger, the full-width alphabetical characters "Operating" in the selected character string are converted to half-width characters "Operating".

A state #73 is a state in which a distance between the thumb and the index finger is further narrowed from the state #72 without separating the fingers from the display screen 12, in which by the second finger movement, the full-width katakana characters "SHISUTEMU" in the selected character string are converted to half-width characters "SHISUTEMU".

A state #74 is a state in which a distance between the thumb and the index finger is further narrowed from the state #73 without separating the fingers from the display screen 12, in which by the third finger movement, the words "Operating (displayed as half-width characters) SHISUTEMU (displayed as half-width Japanese katakana characters)" are converted to an abbreviation "OS (displayed as half-width characters)".

The stepwise character string conversion process depending on a finger movement distance on the display screen 12 is, as described, performed in the preset priority order. That is, first, the character type conversion of alphabetical characters is performed, and then, the character type conversion of katakana characters is performed. Finally, the abbreviation conversion of words is performed.

FIG. 22 including (a) and (b) is an explanatory diagram schematically illustrating another example of the display operation of the mobile phone 100 in FIG. 19, in which a situation of state transition of the display screen 12 at the time of the pinch in operation is illustrated. FIG. 22 (a) illustrates the case where the abbreviation conversion of words is higher in priority order than the character type conversion of alphabetical characters.

In this example, in a conversion target character string "ABCDE (displayed as full-width alphabetical characters) KABUSHIKIKAISHA (displayed as full-width Japanese characters), first step character string conversion causes words "KABUSHIKIKAISHA" in the selected character string to be converted to an abbreviation "(KABU) (displayed as full-width Japanese characters including the parentheses)", and second step character string conversion causes the full-width alphabetical characters "ABCDE" to be converted to half-width characters "ABCDE".

FIG. 22 (b) illustrates the case of performing the character string conversion process in the order of the abbreviation conversion of words, conversion of the type of characters of which the number is smallest, and conversion of another character type. In this example, in a conversion target character string "2 (displayed as a full-width number) CHOME (displayed as two full-width Japanese characters) 13 (displayed as full-width numbers) BAN (displayed as one full-width Japanese character) 12 (displayed as full-width numbers) GOU (displayed as one full-width Japanese character)", first step character string conversion causes words "CHOME", "BAN", and "GO" in the selected character string to be respectively converted to abbreviations "- (hyphen) (displayed as a full-width symbol)", and second step character string conversion causes the full-width symbols "-" as the type of characters of which the number is smallest to be converted to half-width characters "-".

Further, third step character string conversion causes the numbers as the type of characters of which the number is large to be converted to half-width characters. Regarding the character type conversion, as described, the priority order may be dynamically changed depending on the number of characters in a selected character string. According to the present embodiment, in user-specified priority order, the conversion process of a selected character string can be performed.

Note that, in any of the first to fourth embodiments, described is an example of the case where when a character string is displayed in the horizontal writing style, the character type conversion between a full-width character and a half-width character or the abbreviation conversion is performed by the horizontal pinch in or pinch out operation; however, the present invention is not limited to this. For example, the present invention may be configured to, when a character string is displayed in the vertical writing style, perform the abbreviation conversion by the vertical pinch in or pinch out operation, or perform the character type conversion between a full-width character and a half-width character by the horizontal pinch in or pinch out operation.

Also, in any of the second to fourth embodiments, described is an example of the case where the character string conversion process is performed every time a distance between operation positions is changed by a constant value; however, the present invention is not limited to this. For example, the present invention may be configured to, when a distance between operation positions is changed, perform a conversion process that is different depending on an amount of change in distance per constant time. By making a configuration in this manner, a conversion process can be performed stepwise in priority order, or a character string can be converted with an intervening conversion process being omitted.

In the case of the character string in FIG. 11, by slowly moving the finger, the first step character string conversion can be performed from the state #42 to the state #43, and by further moving the finger, the second step character string conversion can be performed from the state #43 to the state #44. On the other hand, by quickly moving the finger, without passing through the step of the state #43, the character string can be converted from the state #42 to the state #44.

Also, in any of the first to fourth embodiments, described is an example of the case where the display screen 12 serves as the detection surface for the down and up events; however, the present invention is not limited to this. For example, the present invention can also be applied to a mobile information terminal in which a display screen on which a character string is displayed and a detection surface for the down and up events are provided in different positions of a terminal housing 10.

Further, in any of the first to fourth embodiments, described is an example of the case where a character string is displayed on the touch panel display 26 of the mobile phone 100, and operation on the touch panel display 26 is detected to perform a conversion process such as the character type conversion; however, the present invention is not limited to this. For example, the present invention can also be applied to an information display system that uses a projector utilizing an AR (Augmented Reality) technique to project a virtual display screen into space; on the display screen, displays a character string; further uses a detector, which detects a position of a hand or finger of a user in the space, to detect operation on the display screen; and performs a conversion process of the character string.

Still further, in any of the first to fourth embodiments, described is an example of the case where on the display screen 12, Japanese characters are displayed; however, the present invention is not limited to this, but can also be applied to languages other than Japanese, such as Chinese, Korean, and English.

This application claims priority under the Paris Convention based on the following patent application in Japan: the patent application filed on Mar. 23, 2010 (Japanese patent application No. 2010-66586), the entire content of which is incorporated herein by reference.

DESCRIPTION OF REFERENCE SYMBOLS

10: Terminal housing
11: Receiver
12: Display screen
13,14: Operation key
15: Transmitting microphone
21: Antenna
22: Cellular communication part
23: Audio codec
24: Key input part
25: CPU
26: Touch panel display
27: Touch panel controller
28: Application program storage part
31: Document data storage part
32: Character code conversion information storage part
33: Display control part
34: character string selecting part
35: Pinch operation detecting part
36: Character string converting part
37: Analysis part
38: Code converting part
51: Dictionary information storage part
61: Conversion candidate display part
62: Conversion candidate selecting part
71: Setting screen display part
72: Priority order determination part
80: Setting screen
100: Mobile phone

What is claimed is:

1. An information display device comprising:
a display screen for displaying a character string;
operation position detecting means adapted to detect an operation position on said display screen;
character string selecting means adapted to, when two operations are simultaneously performed on said display screen, and two different operation positions are detected, on a basis of said detected operation positions, select a character string including one or more characters, the character string being displayed on said display screen;
pinch operation detecting means adapted to, on a basis of a change in a distance between said operation positions, detect a pinch in operation that narrows the distance between said operation positions, and a pinch out operation that enlarges the distance; and
character string converting means adapted to, on a basis of a result of the detection by said pinch operation detecting means, performs a conversion process of said selected character string, said conversion process is opposite to each other when said pinch in operation is detected and when said pinch out operation is detected, respectively, wherein
in a case where the pinch in operation is detected, the character string converting means converts an upper case character in the character string into a corresponding lower case character, and
in a case where the pinch out operation is detected, the character string converting means converts a lower case character in the character string into a corresponding upper case character.

2. The information display device according to claim 1, wherein
said character string converting means performs the conversion process every time the distance between said operation positions are changed by a constant value.

3. An information display device comprising:
a display screen for displaying a character string;
operation position detecting means adapted to detect an operation position on said display screen;
character string selecting means adapted to, when two operations are simultaneously performed on said display screen, and two different operation positions are detected, on a basis of said detected operation positions, select a character string including one or more characters, the character string being displayed on said display screen;
pinch operation detecting means adapted to, on a basis of a change in a distance between said operation positions, detect a pinch in operation that narrows the distance between said operation positions, and a pinch out operation that enlarges the distance; and
character string converting means adapted to, on a basis of a result of the detection by said pinch operation detecting means, performs a conversion process of said selected character string, said conversion process is opposite to each other when said pinch in operation is detected and when said pinch out operation is detected, respectively, wherein:
said display screen horizontally displays the character string;
said character string selecting means selects a character string including one or more characters when two horizontally separated operation positions are detected, and when two vertically separated operation positions are detected, selects a character string including one character; and
said character string converting means performs conversion processes different from each other when horizontal pinch operation is detected and when vertical pinch operation is detected, respectively.

4. The information display device according to claim 3, wherein
said character string converting means performs a conversion process between a full-width character and a corresponding half-width character when the horizontal pinch operation is detected, and when the vertical pinch operation is detected, performs a conversion process between an upper case character and a corresponding lower case character.

5. An information display device comprising:
a display screen for displaying a character string;
operation position detecting means adapted to detect an operation position on said display screen;
character string selecting means adapted to, when two operations are simultaneously performed on said display screen, and two different operation positions are detected, on a basis of said detected operation positions, select a character string including one or more characters, the character string being displayed on said display screen;
pinch operation detecting means adapted to, on a basis of a change in a distance between said operation positions, detect a pinch in operation that narrows the distance between said operation positions, and a pinch out operation that enlarges the distance; and
character string converting means adapted to, on a basis of a result of the detection by said pinch operation detecting means, performs a conversion process of said selected character string, said conversion process is opposite to each other when said pinch in operation is detected and when said pinch out operation is detected, respectively, wherein
said character string converting means converts a full-width character in the character string to a corresponding half-width character when said pinch in operation is detected, and when said pinch out operation is detected, converts a half-width character in the character string to a corresponding full-width character.

6. An information display device comprising:
a display screen for displaying a character string;
operation position detecting means adapted to detect an operation position on said display screen;
character string selecting means adapted to, when two operations are simultaneously performed on said display screen, and two different operation positions are detected, on a basis of said detected operation positions, select a character string including one or more characters, the character string being displayed on said display screen;
pinch operation detecting means adapted to, on a basis of a change in a distance between said operation positions, detect a pinch in operation that narrows the distance between said operation positions, and a pinch out operation that enlarges the distance;
character string converting means adapted to, on a basis of a result of the detection by said pinch operation detecting means, performs a conversion process of said selected character string, said conversion process is opposite to each other when said pinch in operation is detected and when said pinch out operation is detected, respectively, dictionary information storage means adapted to retain words or idioms with relating each of the words or each of the idioms to a corresponding abbreviation, wherein respectively; and said character string converting means converts the word or the idiom in the character string to the corresponding abbreviation when said pinch in operation is detected, and when said pinch out operation is detected, converts the abbreviation in the character string to the corresponding word or the corresponding idiom.

7. The information display device according to claim 6, comprising:

conversion candidate display means adapted to, when said pinch out operation is detected, on said display screen, display two or more conversion candidates that are words or idioms corresponding to the abbreviation in the selected character string and related to the same abbreviation; and conversion candidate selecting means adapted to, on a basis of user operation, select any of said conversion candidates, wherein said character string converting means converts the abbreviation in the character string to the corresponding word or the corresponding idiom on a basis of a result of the selection by said conversion candidate selecting means.

8. The information display device according to claim 6, comprising priority order determination means adapted to, on a basis of user operation, determine priority order for conversion between a full-width character and a half-width character and conversion between the word or the idiom and the corresponding abbreviation, wherein said character string converting means performs the conversion process in the priority order determined by said priority order determination means.

9. A document data editing method comprising:

an operation position detecting step of detecting an operation position on a display screen for displaying a character string;

a character string selecting step of, when two operations are simultaneously performed on said display screen and two different operation positions are detected, on a basis of said detected operation positions, selecting a character string including one or more characters, the character string being displayed on said display screen;

a pinch operation detecting step of, after the selection of the character string, on a basis of a change in a distance between said operation positions, detecting pinch in operation that narrows the distance between said operation positions, and a pinch out operation that enlarges the distance; and a character string converting step of, on a basis of a result of the detection of said pinch operation, performing a conversion process of said selected character string, said conversion process is opposite to each other when said pinch in operation is detected and when said pinch out operation is detected, respectively, wherein in a case where the pinch in operation is detected, the character string converting step converts an upper case character in the character string into a corresponding lower case character, and in a case where the pinch out operation is detected, the character string converting step converts a lower case character in the character string into a corresponding upper case character.

\* \* \* \* \*